(12) United States Patent
Nishioka et al.

(10) Patent No.: US 10,870,765 B2
(45) Date of Patent: Dec. 22, 2020

(54) AQUEOUS COATING COMPOSITION AND METHOD FOR FORMING A COATING FILM

(71) Applicant: NIPPON PAINT AUTOMOTIVE COATINGS CO., LTD., Osaka (JP)

(72) Inventors: Miho Nishioka, Hirakata (JP); Makoto Shimizu, Hirakata (JP)

(73) Assignee: NIPPON PAINT AUTOMOTIVE COATINGS CO., LTD., Osaka (JP)

(*) Notice: Subject to any disclaimer, the term of this patent is extended or adjusted under 35 U.S.C. 154(b) by 349 days.

(21) Appl. No.: 16/066,113

(22) PCT Filed: Dec. 27, 2016

(86) PCT No.: PCT/JP2016/088921
§ 371 (c)(1),
(2) Date: Jun. 26, 2018

(87) PCT Pub. No.: WO2017/115804
PCT Pub. Date: Jul. 6, 2017

(65) Prior Publication Data
US 2020/0283639 A1 Sep. 10, 2020

(30) Foreign Application Priority Data
Dec. 28, 2015 (JP) .................. 2015-256640

(51) Int. Cl.
| C09D 5/02 | (2006.01) |
| C09D 133/08 | (2006.01) |
| C09D 167/02 | (2006.01) |
| C09D 175/04 | (2006.01) |
| C08G 18/80 | (2006.01) |
| C09D 7/63 | (2018.01) |
| B05D 7/14 | (2006.01) |
| C08K 5/29 | (2006.01) |
| B05D 7/00 | (2006.01) |

(52) U.S. Cl.
CPC ............... C09D 5/02 (2013.01); B05D 7/14 (2013.01); B05D 7/542 (2013.01); C08G 18/80 (2013.01); C08K 5/29 (2013.01); C09D 7/63 (2018.01); C09D 133/08 (2013.01); C09D 167/02 (2013.01); C09D 175/04 (2013.01); B05D 2202/10 (2013.01); B05D 2203/00 (2013.01)

(58) Field of Classification Search
CPC .......... C09D 5/02; C09D 7/63; C09D 133/08; C09D 167/02; C09D 175/04; B05D 7/14; B05D 7/542; B05D 2202/10; B05D 2203/00; C08G 18/80; C08K 5/29
USPC ........................................ 524/501
See application file for complete search history.

(56) References Cited

U.S. PATENT DOCUMENTS

| 5,834,555 A | 11/1998 | Meisenburg et al. |
| 2005/0161330 A1 | 7/2005 | Toi et al. |
| 2006/0121204 A1 | 6/2006 | Nakae et al. |
| 2009/0171016 A1* | 7/2009 | Sato ............... C08K 5/29 524/608 |
| 2011/0108426 A1 | 5/2011 | Hayashi et al. |
| 2015/0376390 A1 | 12/2015 | Kosugi et al. |

FOREIGN PATENT DOCUMENTS

| GB | 2 187 194 | 9/1987 |
| JP | 63-059375 | 3/1988 |
| JP | 6-192616 | 7/1994 |
| JP | 7-166128 | 6/1995 |
| JP | 2005-238222 | 9/2005 |
| JP | 2009-516638 | 4/2009 |
| JP | 2011-131135 | 7/2011 |
| JP | 2013-60577 | 4/2013 |
| JP | 2013-133445 | 7/2013 |
| JP | 2015-917 | 1/2015 |
| JP | 2015-120821 | 7/2015 |
| JP | 2015/164983 | 9/2015 |
| WO | 03/004575 | 1/2003 |
| WO | 2005/075587 | 8/2005 |
| WO | 2013/027093 | 2/2013 |

OTHER PUBLICATIONS

Notification of Transmittal of Translation of the International Preliminary Report on Patentability dated Jul. 3, 2018 in International Application No. PCT/JP2016/088921.
International Search Report dated Mar. 14, 2017 in International Application No. PCT/JP/2016/088921.
Extended European Search Report dated Jul. 25, 2019 in corresponding European Patent Application No. 16881778.1.

* cited by examiner

Primary Examiner — William K Cheung
(74) Attorney, Agent, or Firm — Wenderoth, Lind & Ponack, L.L.P.

(57) ABSTRACT

The objective of the present invention is to provide an aqueous coating composition which has excellent curability at low temperatures. The present invention provides an aqueous coating composition which contains an aqueous resin having a hydroxyl group and a carboxyl group (A), a water-dispersible blocked polyisocyanate compound (B), a hydrophilicized carbodiimide compound (C), and an aqueous polyurethane resin (D), wherein the aqueous resin having a hydroxyl group and a carboxyl group (A) has a hydroxyl value of 80 to 200 mgKOH/g and an acid value of 10 to 40 mgKOH/g in terms of resin solid content, the aqueous polyurethane resin (D) has a glass transition point (Tg) of −50° C. or less, and a cured film of the aqueous polyurethane resin (D) has an elongation at break of 400% or more at −20° C.

13 Claims, No Drawings

AQUEOUS COATING COMPOSITION AND METHOD FOR FORMING A COATING FILM

TECHNICAL FIELD

The present invention relates to an aqueous coating composition and a method for forming a coating film in which the aqueous coating composition is used.

BACKGROUND ART

On a surface of an object to be coated such as an automobile body, a plurality of coating films having various roles are formed sequentially, and thus the object to be coated is protected, as well as beautiful appearance and an excellent design are concurrently provided. A common method for forming such a plurality of coating films is a method in which an undercoating film such as an electrodeposition coating film is formed on an object to be coated that is excellent in conductivity, and then an intermediate coating film according to necessity is formed thereon, and further a top coating film is formed.

In view of further request for reducing burden on the environment such as energy saving and reduction in $CO_2$ emission, a heat curing step in coating film formation is required to be minimized as much as possible. However, in automobile coating with an aqueous coating composition, when a two-coat-one-bake multilayer coating film obtained by a two-coat-one-bake coating method in which an uncured base coating film and an uncured clear coating film are formed sequentially on an automobile body having a cured electrodeposition coating film and a cured intermediate coating film in order, and then the two uncured coating films are heated and cured at once is compared with a three-wet multilayer coating film obtained by a three-wet coating method in which an uncured first base coating film, an uncured second base coating film, and an uncured clear coating film formed on an automobile body having a cured electrodeposition coating film are heated and cured at once, the three-wet multiplayer coating film is required that the first base coating film is made thinner than the first base coating film of the two-coat-one-bake multilayer coating film in order to secure the smoothness of the coating film. As a result, a chipping resistance of the multilayer coating film is reduced, so that the following problems may be caused: the multilayer coating film may be destroyed when a stepping stone or the like collides with the coating film during moving the automobile, and a damage due to the destruction reaches the steel plate; and the peeling may be caused at the interface between the steel plate and the electrodeposition coating film, or at the interface between the electrodeposition coating film and the first base coating film.

Moreover, in coating of automobile bodies, for the purpose of simplifying coating step and coating management and improving hue consistency in a coated product, it has been demanded to unify coating compositions to be used for coating various components. The components of an automobile body include, for example, a steel plate and a resin member. Resin members themselves are low in heat resistance as compared with steel plates. Therefore, it is unnecessary to set a curing temperature of a coating composition to be lower than before. On the other hand, when a temperature of a curing step is made lower, a crosslinking density of a resulting coating film decreases and performance such as chipping resistance may deteriorate.

JP-A-2011-131135 (Patent Document 1) discloses a method for forming a multiplayer coating film that involves applying an aqueous intermediate coating composition to a substrate having both a steel plate and a plastic substrate to form an intermediate coating film, then applying an aqueous base coating composition to the formed intermediate coating film to form a base coating film, then applying an organic solvent type clear coating composition to form a clear coating film, and heating and curing the three layers, namely, the intermediate coating film, the base coating film, and the clear coating film, in which the aqueous base coating composition contains (a) an acrylic resin emulsion, (b) a water-soluble acrylic resin, (c) a melamine resin, and (d) a propylene glycol monoalkyl ether. However, a multilayer coating film obtained by this forming method may not exhibit sufficient chipping resistance when being cured, for example, at a temperature of 100° C. or less.

JP-A-2013-133445 (Patent Document 2) discloses an aqueous coating composition containing (A) an aqueous resin having a hydroxyl group and a carboxyl group, (B) a polyisocyanate compound, and (C) a hydrdophilicized carbodiimide compound. In Patent Document 2, coating material stability, pot life, and crosslinking density retention are evaluated (paragraphs [0132], [0137], [0138], etc.). These evaluated items show that the aqueous coating composition disclosed in Patent Document 2 is a so-called two-component type coating composition that is a composition in which a curing reaction partially proceeds by mixing respective components. By contrast, the aqueous coating composition of the present invention differs in invention configuration in that the composition is not a two-component type coating composition but a so-called one-component coating composition.

PRIOR ART DOCUMENTS

Patent Documents

Patent Document 1: JP-A-2011-131135
Patent Document 2: JP-A-2013-133445

SUMMARY OF INVENTION

Technical Problems

The present invention solves the above existing problems and an object thereof is to provide a one-component aqueous coating composition excellent in low-temperature curability.

Solutions to the Problems

The present invention provides the following aspects to solve the aforementioned problems.

[1]

An aqueous coating composition comprising:
an aqueous resin having a hydroxyl group and a carboxyl group (A),
a water-dispersible blocked polyisocyanate compound (B),
a hydrophilicized carbodiimide compound (C), and
an aqueous polyurethane resin (D),
  wherein
  the aqueous resin having a hydroxyl group and a carboxyl group (A) has a hydroxyl value of 80 to 200 mgKOH/g and an acid value of 10 to 40 mgKOH/g in terms of resin solid content,
  the hydrophilicized carbodiimide compound (C) is a compound represented by formula (I), (II), or (III) below,
  the aqueous polyurethane resin (D) has a glass transition point (Tg) of −50° C. or less, and a cured film of the aqueous polyurethane resin (D) has an elongation at break of 400% or more at −20° C.,

[Chemical Formula 1]

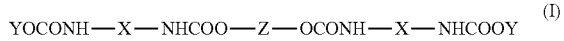
(I)

wherein each X is a bifunctional organic group having at least one carbodiimide group, Y is each same or different structure resulting from elimination of a hydroxyl group from a polyalkylene glycol monoalkyl ether, and Z is a structure resulting from elimination of a hydroxyl group from a bifunctional polyol having a number-average molecular weight of 200 to 5,000,

[Chemical Formula 2]

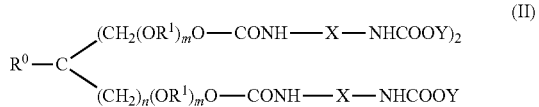
(II)

wherein each X is a bifunctional organic group having at least one carbodiimide group, Y is each same or different structure resulting from elimination of a hydroxyl group from a polyalkylene glycol monoalkyl ether, $R^0$ is hydrogen, a methyl group or an ethyl group, each $R^1$ is an alkylene group having 4 or less carbon atoms, n is 0 or 1, and each m is a number from 0 to 60,

[Chemical Formula 3]

(III)

wherein X is a bifunctional organic group having at least one carbodiimide group, and Y is each same or different structure resulting from elimination of a hydroxyl group from a polyalkylene glycol monoalkyl ether.

[2]
The aqueous coating composition, wherein a content of the hydrophilicized carbodiimide compound (C) is 1 to 8% by means in terms of a resin solid content of the aqueous coating composition.

[3]
The aqueous coating composition, wherein the aqueous resin (A) contains an acrylic emulsion having a number-average molecular weight of 10,000 to 80,000.

[4]
The aqueous coating composition, wherein the hydrophilicized carbodiimide compound (C) represented by the formula (III) above is a compound below,

[Chemical Formula 4]

(III)

wherein X is a bifunctional organic group having at least one carbodiimide group, and Y is each same or different structure selected from (i) and (ii) below:
(i) a structure resulting from elimination of a hydroxyl group from a polyethylene glycol monoalkyl ether in which an alkyl group having 1 to 3 carbon atoms is ether-linked to an end of a polyethylene oxide unit having a repeat number of 6 to 20,
(ii) a structure resulting from elimination of a hydroxyl group from a polypropylene glycol monoalkyl ether in which an alkyl group having 1 to 8 carbon atoms is ether-linked to an end of a polypropylene oxide unit having a repeat number of 4 to 60.

[5]
The aqueous coating composition, wherein in the hydrophilicized carbodiimide compound (C) represented by the formula (III) above,
one Y is the (i) and another Y is the (ii), and
a ratio of the structure (i) to the structure (ii) is within a range of (i):(ii)=1:0.7 to 1:8.

[6]
The aqueous coating composition, wherein a content of the aqueous polyurethane resin (D) is 15% by mass or more in terms of the resin solid content of the aqueous coating composition.

[7]
The aqueous coating composition, wherein a content of the aqueous polyurethane resin (D) is 30% by mass or more and 40% by mass or less in terms of the resin solid content of the aqueous coating composition.

[8]
The aqueous coating composition, wherein a content of the aqueous polyurethane resin (D) is 15% by mass or more and less than 30% by mass in terms of the resin solid content of the aqueous coating composition.

[9]
The aqueous coating composition, wherein
a content of the water-dispersible blocked polyisocyanate compound (B) is 10 to 25% by mass in terms of the resin solid content of the aqueous coating composition, and
a content of the hydrophilicized carbodiimide compound (C) is 1.5 to 7% by mass in terms of the resin solid content of the aqueous coating composition.

[10]
The aqueous coating composition, wherein a mass ratio of the content of the water-dispersible blocked polyisocyanate compound (B) to the content of the hydrophilicized carbodiimide compound (C) in terms of the resin solid content of the aqueous coating composition is (B):(C)=25:1 to 1.25:1.

[11]
A method for forming a coating film in use of an aqueous coating composition, wherein the method comprises:
a coating step of applying the aqueous coating composition to an abject to be coated to form a coating film, and
a curing step of curing the resulting coating film at 70 to 100° C.

[12]
The method for forming a coating film, wherein
the coating step comprises:
a first coating step of applying onto an object to be coated an aqueous coating composition in which a content of a aqueous polyurethane resin (D) is 30% by mass or more and 40% by mass or less in terms of a resin solid content of the aqueous coating composition to form a first coating film, and
a second coating step of applying onto the first coating film an aqueous coating composition in which the content of the aqueous polyurethane resin (D) is 15% by mass or more and less than 30% by mass in terms of the resin solid content of the aqueous coating composition to form a second coating film.

[13]

The method for forming a coating film, wherein the object to be coated includes a steel plate part and a resin part.

Effect of Invention

The aqueous coating composition of the present invention is advantageous in that a curing reaction proceeds well even under heating conditions under low temperature conditions (e.g., heating conditions at 100° C. or less), so that a cured coating film having excellent coating film properties can be obtained. The aqueous coating composition of the present invention can be used suitably for coating of an object to be coated having a steel plate part and a resin part, which is difficult to be subjected to high-temperature heat curing treatment but is required to be excellent in coating film properties (water resistance, chipping resistance, etc.).

Mode for Carrying Out the Invention

The aqueous coating composition of the present invention contains:
an aqueous resin having a hydroxyl group carboxyl group (A),
water-dispersible blocked polyisocyanate compound (B),
a hydrophilicized carbodiimide compound (C), and
an aqueous polyurethane resin (D). Hereafter, components (A) to (D) and their characteristics will be described in detail.

Aqueous Resin having Hydroxyl Group and Carboxyl Group (A)

The aqueous resin having a hydroxyl group and carboxyl group (A) is a binder component that undergoes a curing reaction with the water-dispersible blocked polyisocyanate compound (B) and the hydrophilicized carbodiimide compound (C), which will be described below. The aqueous resin having a hydroxyl group and a carboxyl group (A) to be used in the present invention is required to have:

a hydroxyl value of 80 to 200 mgKOH/g in terms of resin solid content, and an acid value of 10 to 40 mgKOH/g in terms of resin solid content.

The hydroxyl value in terms of resin solid content may preferably be 80 to 160 mgKOH/g, and the acid value in terms of resin solid content may preferably be 15 to 35 mgKOH/g.

The aqueous resin having a hydroxyl group and a carboxyl group (A) to be used in the present invention is high in hydroxyl value as compared with acid value. Inclusion of such an aqueous resin as well as the components (B) to (D) offers an advantage that good chipping resistance is obtained even when the aqueous coating composition is applied and then cured at a low temperature.

The aqueous resin (A) may be composed of one type of resin satisfying the above requirement regarding a hydroxyl value and an acid value in terms of resin solid content or alternatively may be composed of two or more resins each satisfying the above requirement regarding a hydroxyl value and an acid value.

The aqueous resin (A) has two types of functional groups, namely, a hydroxyl group and a carboxyl group, as reactive groups that participate in curing. In the aqueous coating composition of the present invention, the hydroxyl group of the aqueous resin (A) reacts with the polyisocyanate compound (B) and the carboxyl group of the aqueous resin (A) reacts with the hydrophilicized carbodiimide compound (C).

The aqueous resin (A) is not particularly limited with respect to its type as long as it satisfied the requirement regarding a hydroxyl group and a carboxyl group, but it may preferably be an acrylic resin and/or a polyester resin because these materials are easily produced and easily available. From the viewpoint of adjustment of coating film properties, it may be preferred to use an acrylic resin alone or a mixture of an acrylic resin and a polyester resin as the aqueous resin (A). For example, when the aqueous coating composition is used as an intermediate coating composition, it may be more preferred to use a mixture of an acrylic resin and a polyester resin as the aqueous resin (A). For example, when the aqueous coating composition is used as a top base coating composition, it may be more preferred to use an acrylic resin as the aqueous resin (A).

Concerning the acrylic resin that can be used suitably as the aqueous resin (A), a resin of interest can be obtained, for example, by subjecting to acrylic copolymerization monomers containing an α,β-ethylenically unsaturated monomer having a hydroxyl group and an α,β-ethylenically unsaturated monomer having a carboxyl group in such amounts that satisfy the requirement on the hydroxyl value and the acid value regarding the hydroxyl group and the carboxyl group.

Examples of the β, β-ethylenically unsaturated monomer having a hydroxyl group include 2-hydroxyethyl (meth) acrylate, 2-hydroxypropyl (meth)acrylate, 4-hydroxybutyl (meth)acrylate, allyl alcohol, methacryl alcohol, and an adduct of hydroxyethyl (meth)acrylate and ε-caprolactone. Preferred among these are 2-hydroxyethyl (meth)acrylate, 4-hydroxybutyl (meth)acrylate, and an adduct of 2-hydroxyethyl (meth)acrylate and ε-caprolactone. In the present description, "(meth)acryl" shall mean both acryl and methacryl.

Examples of the α,β-ethylenically unsaturated monomer having a carboxyl group include acrylic acid, methacrylic acid, acrylic acid dimer, crotonic acid, 2-acryloyloxyethylphthalic acid, 2-acryloyloxyethylsuccinic acid, ω-carboxy-polycaprolactone mono(meth)acrylate, maleic acid, fumaric acid, and itaconic acid. Preferred among these are acrylic acid and methacrylic acid.

In the acrylic copolymerization for obtaining the aqueous resin (A), other α, β-ethylenically unsaturated monomer can be used if necessary. Examples of the other α,β-ethylenically unsaturated monomer include (meth)acrylic acid esters (e.g., methyl (meth)acrylate, ethyl (meth)acrylate, n-propyl (meth)acrylate, n-butyl (meth)acrylate, isobutyl (meth)acrylate, tert-butyl (meth)acrylate, 2-ethylhexyl (meth)acrylate, lauryl methacrylate, phenyl acrylate, isobornyl (meth)acrylate, cyclohexyl methacrylate, (meth)acrylic acid tert-butyl cyclohexyl, dicyclopentadienyl (meth)acrylate, and dihydrodicyclopentadienyl (meth)acrylate), and polymerizable amide compounds (e.g., (meth)acrylamide, N-methylol (meth)acrylamide, and N-butoxymethyl(meth)acrylamide).

The method for obtaining the aqueous resin (A) may be a method in which an acrylic resin is obtained by performing solution polymerization and then the resulting material is subjected to hydrophilization or a method in which an emulsion is obtained by performing emulsion polymerization in an aqueous medium.

When an emulsion is obtained by performing emulsion polymerization, a crosslinking monomer can be used as the other α,β-ethylenically unsaturated monomer. The crosslinking monomer is a compound having two or more radically polymerizable, ethylenically unsaturated groups in its molecule, and examples thereof include divinylbenzene, allyl (meth)acrylate, and ethylene glycol di(meth)acrylate.

The solution polymerization mentioned above is commonly a method that involves stirring a solvent while dropping thereinto a mixture of α,β-ethylenically unsaturated monomers to be used as raw materials together with a polymerization initiator under heating conditions. The conditions for the solution polymerization may include a polymerization temperature of 60 to 160° C. and a dropping time of 0.5 to 10 hours, for example. The α,β-ethylenically unsaturated monomers to be used as raw materials may be polymerized separately in two steps. In this case, the α,β-ethylenically unsaturated monomers to be used as raw materials are required as a whole to satisfy the requirement regarding a hydroxyl group and a carboxyl group.

The polymerization initiator mentioned above is not particularly limited as long as the polymerization initiator is used for common polymerization, and examples thereof include azo compounds and peroxides. Generally, an amount of the polymerization initiator relative to 100 parts by mass of the monomer mixture is 0.1 to 18 parts by mass, and preferably 0.3 to 12 parts by mass.

The solvent that can be used here is not particularly limited as long as the solvent does not affect the reaction adversely, and examples thereof include alcohols, ketones, ethers, and hydrocarbon solvents. Moreover, in order to adjust the molecular weight, a mercaptan such as lauryl mercaptan, or a chain transfer agent such as α-methylstyrene dimer may be used if necessary.

The acrylic resin thus obtained by solution polymerization has a number-average molecular weight of preferably 4,000 to 20,000. In the present description, the number-average molecular weight of the acrylic resin obtained by solution polymerization can be measured by gel permeation chromatography (GPC) using a polystyrene standard sample.

The acrylic resin has a glass transition point (Tg) of preferably within a range of −20 to 80° C. The glass transition point of an acrylic resin can be determined by calculation from the type and amount of the monomers used for the preparation of the acrylic resin. The glass transition point of the acrylic resin may be measured with a differential scanning calorimeter (DSC).

The acrylic resin resulting from the solution polymerization described above is subjected to removal of the solvent if necessary, and then a basic material is added thereto and the resulting material is subjected to hydrophilization, so that the aqueous resin (A) is obtained. Examples of the basic compound include ammonia, methylamine, ethylamine, dimethylamine, diethylamine, trimethylamine, triethylamine, dimethylethanolamine, diethanolamine, diethylaminoethanol, and triethanolamine. An amount of the basic compound to be added may preferably be adjusted such that a neutralization ratio relative to the carboxyl groups that the acrylic resin resulting from the solution polymerization has is 60 to 100%. When the neutralization ratio is less than 60%, the hydrophilization is insufficient and the storage stability may be poor. A resin solid content of the thus-obtained aqueous resin (A) is commonly adjusted to 25 to 55% by mass.

The thus-obtained acrylic resin can be used in the form of an aqueous acrylic dispersion. Such an aqueous acrylic dispersion preferably has a volume-average particle diameter within a range of 0.01 to 1 μm. The fact that the volume-average particle diameter is within the above range offers an advantage that the stability of the aqueous dispersion is improved and the appearance of a resulting coating film is also improved. The same applies to an acrylic emulsion described below, and the volume-average particle diameter can be adjusted through the adjustment of the monomer composition and/or the emulsion polymerization conditions.

When emulsion polymerization in an aqueous medium is performed during the preparation of the aqueous resin (A), the polymerization can be carried out, for example, by dissolving an emulsifier in the aqueous medium containing water and, if necessary, an organic solvent such as an alcohol, and dropping a polymerization initiator and a mixture of the α,β-ethylenically unsaturated monomers to be used as raw materials with stirring under heat. The mixture of the α,β-ethylenically unsaturated monomers to be used as raw materials may be emulsified in advance using an emulsifier and water.

Examples of the polymerization initiator that can be suitably used for emulsion polymerization include lipophilic azo compounds (e.g., azobisisobutyronitrile, 2,2'-azobis(2-methylbutyronitrile), and 2,2'-azobis(2,4-dimethylvaleronitrile)); hydrophilic azo compounds (e.g., 4,4'-azobis(4-cyanovaleric acid) and 2,2-azobis(N-(2-carboxyethyl)-2-methylpropionamidine, which are anionic, and 2,2'-azobis (2-methylpropionamidine), which is cationic); redox-type lipophilic peroxides (e.g., benzoyl peroxide, parachlorobenzoyl peroxide, lauroyl peroxide, and tert-butyl perbenzoate); and redox-type hydrophilic peroxides (e.g., potassium persulfate and ammonium persulfate).

As the emulsifier, common emulsifiers that a person skilled in the art usually uses can be used. Particularly preferred as the emulsifier are reactive emulsifiers, e.g., Antox MS-60 (produced by Nippon Nyukazai Co., Ltd.), Eleminol JS-2 (produced by Sanyo Chemical Industries, Ltd.), ADEKA REASOAP NE-20 (produced by ADEKA, Inc.), Aqualon HS-10 (produced by Dai-Ichi Kogyo Seiyaku Co., Ltd.), and LATEMUL PD-104 (produced by Kao Corporation). Moreover, in order to adjust the molecular weight, mercaptan such as lauryl mercaptan, or a chain transfer agent such as α-methylstyrene dimer may be used if necessary.

A reaction temperature is determined depending on an initiator, and for example, the reaction temperature is 60 to 90° C. for azo initiators or peroxides and may preferably be 30 to 70° C. for redox type initiators. Generally, a reaction time is 1 to 8 hours. Generally, an amount of the initiator relative to 100 parts by mass of the monomer mixture is 0.1 to 5% by mass. The emulsion polymerization may be performed in multiple steps, for example, in two steps. That is, a portion of the mixture of the α,β-ethylenically unsaturated monomers to be used as raw materials is subjected to emulsion polymerization, and then the remainder of the α,β-ethylenically unsaturated monomer mixture is added thereto and subjected to further emulsion polymerization.

From the viewpoint of storage stability, the emulsion can be used at pH 5 to 10 through neutralization with a basic compound. The basic compound may be the same as that to be used in the hydrophilization of the acrylic resin obtained in the preceding solution polymerization. The neutralization may preferably be carried out by adding the aforementioned basic compound to the system before or after the emulsion polymerization.

When an acrylic emulsion is used as the aqueous resin (A), the acrylic emulsion may preferably have a number-average molecular weight of 10,000 to 80,000. The fact that the acrylic emulsion has a hydroxy value of 80 to 200 mgKOH/g, an acid value of 10 to 40 mgKOH/g, and a ratio of the hydroxyl value to the acid value of 3 to 15, and a number-average molecular weight within a range of 10,000 to 80,000 offers an advantage that coating material stability is kept good and the crosslinking density in a resulting coating film falls into a better range. This is considered to be because the low-temperature curability of the polyisocyanate compound (B) that reacts with the hydroxyl groups of the aqueous resin (A) is secured due to the fact that the range of the number-average molecular weight is a relatively high range of 10,000 to 80,000 and the acrylic emulsion has hydroxyl groups as many as shown by the above range, and thus the crosslinking density in a resulting coating film will fall within a better range.

The number-average molecular weight of the acrylic emulsion can be measured by gel permeation chromatography (GPC) using a polystyrene standard sample after removing moisture by reduced pressure drying or the like.

The aqueous resin (A) may contain a polyester resin. Generally, the polyester resin that can be used as the aqueous resin (A) can be prepared by condensing a polyhydric alcohol component and a polybasic acid component such that the requirement regarding a hydroxyl group and a carboxyl group will be satisfied.

Examples of the polyhydric alcohol component may include hydroxycarboxylic acid components such as ethylene glycol, diethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, neopentyl glycol hydroxypivalate ester, 2-butyl-2-ethyl-1,3-propanediol, 3-methyl-1,5-pentanediol, and 2,2,4-trimethylpentanediol.

Examples of the polybasic acid component may include polybasic acid components and anhydrides thereof such as aromatic polycarboxylic acids and anhydrides including phthalic anhydride, isophthalic acid, terephthalic acid, trimellitic anhydride, tetrachlorophthalic anhydride, and pyromellitic anhydride; alicyclic polycarboxylic acids and anhydrides thereof including hexahydrophthalic anhydride, tetrahydrophthalic anhydride, and 1,4- and 1,3-cyclohexanedicarboxylic acids; aliphatic polycarboxylic acids and anhydrides thereof including maleic anhydride, fumaric acid, succinic anhydride, adipic acid, and sebacic acid. A monobasic acid such as benzoic acid or tert-butylbenzoic acid may be used together, if necessary.

Moreover, monohydric alcohols, monoepoxide compounds such as CARDURA E (trade name, produced by Shell Chemical), and lactones (β-propiolactone, dimethylpropiolactone, butyrolactone, γ-valerolactone, ε-caprolactone, γ-caprolactone, etc.) may be used together as reaction components.

In addition to the above-mentioned components, fatty acids such as castor oil and dehydrated castor oil, and an oil component that is a mixture of one or two or more of such fatty acids may be added to the acid component and the alcohol component. Moreover, it is also possible to graft an acrylic resin or vinyl resin or to react a polyisocyanate compound as long as the requirement regarding a hydroxyl group and a carboxyl group is satisfied.

The thus-obtained polyester resin may preferably have a number-average molecular weight of 500 to 20,000, and more preferably 1,500 to 10,000. When the number-average molecular weight is less than 500, the storage stability may deteriorate in the case where the polyester resin is dispersed in water. When the number average molecular weight exceeds 20,000, the viscosity of the polyester resin increases, and therefore, the solid concentration decreases when the polyester resin is formed into a coating composition and coating workability may deteriorate.

The polyester resin may preferably have a glass transition point of −20 to 80° C. When the glass transition point is less than −20° C., the hardness of a resulting coating film may decrease, and when exceeding 80° C., the base hiding property may deteriorate. The glass transition point may more preferably be of 0 to 60° C. The glass transition point of the polyester resin can be determined by calculation from the type and amount of the monomers used for the preparation of the polyester resin, as in the case of the acrylic resin. The glass transition point of the polyester resin may be measured with a differential scanning calorimeter (DSC).

The aqueous resin (A) can be obtained by neutralizing the thus-obtained polyester resin with any of the basic compounds mentioned previously.

A content of the aqueous resin (A) contained in the aqueous coating composition of the present invention may preferably be 20 to 70% by mass, more preferably 25 to 60% by mass, relative to the resin solid content of the aqueous coating composition.

For example, when the aqueous coating composition is used as an intermediate coating composition and a mixture of an acrylic resin and a polyester resin is used as the aqueous resin (A), a ratio of the acrylic resin and the polyester resin may preferably be within a range of acrylic resin/polyester resin=5/1 to 1/1.

Water-Dispersible Blocked Polyisocyanate Compound (B)

The water-dispersible blocked polyisocyanate compound (B) contained in the aqueous coating composition of the present invention can be prepared by reacting a malonic diester (B-2) with a polyisocyanate (B-1) and subsequently reacting the resulting reaction product with an organic amine compound (B-3).

The polyisocyanate (B-1) is one or more species selected from aliphatic polyisocyanates, alicyclic polyisocyanates, and aromatic polyisocyanates.

Examples of the aliphatic polyisocyanates include aliphatic diisocyanates, isocyanate lysine triisocyanate (hereinafter referred to as LTI), 4-isocyanatomethyl-1,8-octamethylene diisocyanate (trimmer triisocyanate: hereinafter referred to as TTI), and bis(2-isocyanatoethyl) 2-isocyanatoglutarate (glutamate triisocyanate: hereinafter referred to as GTI).

The aliphatic diisocyanate to be used as the aliphatic polyisocyanate may preferably be a aliphatic diisocyanate having 4 to 30 carbon atoms, and examples of the aliphatic diisocyanate having 4 to 30 carbon atoms include tetramethylene diisocyanate, pentamethylene diisocyanate, hexamethylene diisocyanate (hereinafter referred to as HDI), 2,2,4-trimethyl-1,6-diisocyanatohexane, and lysine diisocyanate. Especially, HDI may be preferred because of its good industrial availability. The aliphatic diisocyanate may be used singly or alternatively two or more species thereof may be used in combination.

As the alicyclic polyisocyanate, alicyclic diisocyanates mentioned below are mainly used. As the alicyclic diisocyanate, an alicyclic diisocyanate having 8 to 30 carbon atoms may be preferred, and examples thereof include isophorone diisocyanate (hereinafter referred to as IPDI), 1,3-bis(isocycnatomethyl)-cyclohexane, 4,4'-dicyclohexylmethane diisocyanate, norbornene diisocyanate, and hydrogenated xylylene diisocyanate. Especially, IPDI may be preferred because of its good weatherability and industrial availability. The alicyclic diisocyanate may be used singly or alternatively two or mere species thereof may be used in combination.

As the aromatic polyisocyanate, aromatic diisocyanates mentioned below are mainly used. Examples of the aromatic diisocyanate include 2,4-tolylene diisocyanate, 2,6-toylene diisocyanate, 4,4'-diphenylmethane diisocyanate, naphthalene diisocyanate, and xylylene diisocyanate. The aromatic diisocyanate may be used singly or alternatively two or more species thereof may be used in combination.

Of these polyisocyanates, aliphatic polyisocyanates and/or alicyclic polyisocyanates are preferred because of their excellent weatherability. Moreover, of the aliphatic polyisocyanates, aliphatic diisocyanates are most preferred.

Examples of the polyisocyanate include triisocyanates such as LTI, TTI and GTI, and in addition to their derivatives, oligomers, namely, dimers to 20-mers of diisocyanate produced by forming biuret linkages, urea linkages, isocyanurate linkages, urethodione linkages, urethane linkages, allophanate linkages, oxadiazinetrione linkages, etc.

The malonic diester (B-2) to be reacted with the polyisocyanate (B-1) is a compound represented by the following formula.

[Chemical Formula 5]

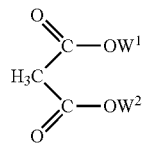

In the above formula, $W^1$ and $W^2$ are each independently an alkyl group having 1 to 8 carbon atoms, a phenyl group, or a benzyl group The phenyl group or the benzyl group may have 1 to 3 substituents. Examples of the substituents include alkyl groups having 1 to 6 carbon atoms, halogen atoms such as fluorine atom and chlorine atom, an amino group, a sulfonyl group, and a hydroxyl group. $W^1$ and $W^2$ may be either same or different.

Specific examples of the malonic diester (B-2) include dimethyl malonate, diethyl malonate, di-n-propyl malonate, diisopropyl malonate, di-n-butyl malonate, diisobutyl malonate, di-tert-butyl malonate, methyl tert-butyl malonate, di-n-hexyl malonate, di(2-ethylhexyl) malonate, diphenyl malonate, and dibenzyl malonate. Of these, dimethyl malonate, diethyl malonate, di-n-propyl malonate, diisopropyl malonate, di-n-butyl malonate, diisobutyl malonate, di-tert-butyl malonate, methyl tert-butyl malonate, di-n-hexyl malonate, and di(2-ethylhexyl) malonate are preferred. More preferred are dimethyl malonate, diethyl malonate, di-n-propyl malonate, diisopropyl malonate, di-n-butyl malonate, diisobutyl malonate, di-tert-butyl malonate, and methyl tert-butyl malonate, even more preferred are dimethyl malonate and diethyl malonate, and most preferred is diethyl malonate. The malonic diesters mentioned above may be used singly or alternatively two or more species thereof may be used in combination.

As to an amount of the malonic diester (B-2) to be used for the reaction, it may be preferred to use the malonic diester (B-2) in an amount of 75 to 150 mol for 1 mol of isocyanate groups of the polyisocyanate (B-1). This reaction may be performed in the presence of an organic solvent or may be performed without using an organic solvent. When using an organic solvent, it may be preferred to use an organic solvent that is inert to isocyanate groups and resistant to hydrolysis. Examples of preferable organic solvents include ether solvents such as propylene glycol dimethyl ether, dipropylene glycol dimethyl ether, diethylene glycol dimethyl ether, and diethylene glycol diethyl ether, and ketone solvents such as methyl ethyl ketone and methyl isobutyl ketone.

In the above reaction, a reaction catalyst may be used if necessary. Examples of the reaction catalyst include organic salts and alcoholates of metals, such as tin, zinc, and lead, and tertiary amines. The reaction can be performed generally at −20 to 150°°C., preferably 0 to 100° C., and more preferably 40 to 80° C. Side reactions can be suppressed by performing the reaction at 150° C. or less, and the reaction speed can be maintained high by performing the reaction at −20° C. or more.

In the reaction of the polyisocyanate (B-1) and the malonic diester (B-2), a nonionic hydrophilic compound (B-4) may also be reacted. Examples of the nonionic hydrophilic compound include polyethylene glycol-based compounds having at least three continuous ethylene oxide groups. Examples of the polyethylene glycol-based compound include monoalkoxy polyethylene glycols, polyethylene glycols and triols, Pluronic polypropylene glycols and triols in which ethylene oxide is addition polymerized at a polypropylene glycol end, polyoxypropylene polyoxyethylene copolymer diols and triols, polyoxypropylene polyoxyethylene block polymer diols and triols. Especially, monoalkoxy polyethylene glycols and polyethylene glycols are preferred, and monoalkoxy polyethylene glycols are more preferred. A monoalkoxy polyethylene glycol is polyethylene glycol to one end of which an alcohol has been added. Monoalcohols that can be used for monoalkoxy polyethylene glycols preferably have 1 to 8 carbon atoms, more preferably 1 to 6 carbon atoms, and even more preferably 1 to 4 carbon atoms. Most preferred are methanol and ethanol. In other words, of monoalkoxy polyethylene glycols, monomethoxy polyethylene glycol and monoethoxy polyethylene glycol are preferred, and monomethoxy polyethylene glycol is most preferred. Of these polyethylene-based glycol compounds, particularly preferred are polyethylene glycol-based compounds having a number-average molecular weight of 200 to 2000 and having a monoalcohol having 1 to 4 carbon atoms added to one end.

The water-dispersible blocked polyisocyanate compound (B) is prepared by reacting the thus-obtained reaction product with the organic amine compound (B-3). Examples of the organic amine compound (B-3) include chain secondary amine compounds and cyclic secondary amine compounds containing a nitrogen atom. Preferred as the chain secondary amine compound is a dialkylamine having two same or different alkyl groups having 1 to 12 carbon atoms. Preferable examples of the chain secondary amine compound include diisopropylamine, diisobutylamine, di(2-butylamine), di(tert-butyl)amine, dicyclohexylamine, and N-tert-butylcyclohexylamine. Examples of the cyclic secondary amine compound containing a nitrogen atom include aziridine, azetidine, pyrrolidine, 2-methylpyrrolidine, piperidine, 2-methylpiperidine, 3-methylpiperidine, 4-methylpiperidine, 4-benzylpiperidine, 2,4-dimethylpiperidine, 3,5-dimethylpiperidine, 2,6-dimethylpiperidine, 2,2,6,6-tetramethylpiperidine, methyl 4-piperidinecarboxylate, ethyl 4-piperidinecarboxylate, 2,2,6,6-tetramethyl-4-piperidone, 4-piperidinecarboxylate, piperazine, N-methylpiperazine, N-ethylpiperazine, N-allylpiperazine, N-isobutylpiperazine, N-cyclohexylpiperazine, N-cyclopentylpiperazine, N-phenylpiperazine, 1-(2-pyridyl)piperazine, 1-(4-pyridyl)piperazine, 1-(2-pyrimidyl)piperazine, N-methylhomopiperazine, N-acetylhomopiperazine, and N-butyrylhomopiperazine.

The above reaction may be performed using an organic solvent or alternatively may be performed without using an organic solvent. When using an organic solvent, it may be preferred to use an organic solvent that is inert to isocyanate groups and resistant to hydrolysis. Examples of preferable organic solvents include ether solvents such as propylene glycol dimethyl ether, dipropylene glycol dimethyl ether, diethylene glycol dimethyl ether, and diethylene glycol diethyl ether, and ketone solvents such as methyl ethyl ketone and methyl isobutyl ketone.

Storage stability can be improved by blending the thus-obtained water-dispersible blocked polyisocyanate compound (B) with a basic compound in an amount of 10 mol % or more relative to 1 mol of the blocked isocyanate groups which the compound has. Examples of the basic compound include N-allylmorpholine, N-methylmorpholine, N-ethylmorpholine, triethanolamine, and 2-methylimidazole.

A commercially available product may be used as the water-dispersible blocked polyisocyanate compound (B). Examples of the commercially available product include WM44-L70G, which is a blocked polyisocyanate produced by Asahi Kasei Chemicals Corporation.

The water-dispersible blocked polyisocyanate compound (B) is characteristic in that its reactivity is maintained even under a heating condition of 100° C. or less and its curability retention ratio is kept high even after storage in a state where it is contained in an aqueous coating composition.

A content of the water-dispersible blocked polyisocyanate compound (B) contained in the aqueous coating composition of the present invention may preferably be 10 to 25% by mass, more preferably 15 to 22% by mass, relative to the resin solid content of the aqueous coating composition. The fact that the content is within the above range offers an advantage that a curing reaction proceeds well even under heating conditions under low temperature conditions (e.g., heating conditions at 100° C. or less), so that a cured coating film having excellent coating film properties can be obtained.

Hydrophilicized Carbodiimide Compound (C)

The hydrophilicized carbodiimide compound (C) contained in the aqueous coating composition of the present invention has, in its molecule, one or a plurality of structural units represented by

—OCONH—X—NHCOOY wherein X is a bifunctional organic group having at least one carbodiimide group, and Y is a structure resulting from elimination of a hydroxyl group from a polyalkylene glycol monoalkyl ether. It is considered that the inclusion of the structural unit offers both excellent dispersibility in water and excellent curability.

The hydrophilicized carbodiimide compound (C) has three types, namely, a compound having one unit, a compound having two units, and a compound having three units of the structural unit shown above.

One example of the compound having two units of the structural unit shown above is a compound represented by the following formula (I).

[Chemical Formula 6]

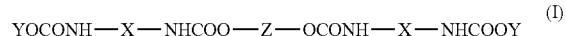

In the above formula (I), each X is a bifunctional organic group having at least one carbodiimide group, Y is each same or different structure resulting from elimination of a hydroxyl group from a polyalkylene glycol monoalkyl ether, and Z is a structure resulting from elimination of a hydroxyl group from a bifunctional polyol having a number-average molecular weight of 200 to 5,000.

Here, X can be represented by the following formula (a).

[Chemical Formula 7]

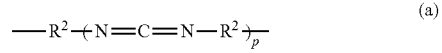

In the above formula (a), each $R^2$ may preferably be a hydrocarbon group having 6 to 15 carbon atoms. Specific examples of the hydrocarbon group may include a phenylene group, a diphenylenemethyl group, a diphenylene (dimethyl)methyl group, a methylphenylene group, a dimethylphenylene group, a tetramethylxylylene group, a hexylene group, a cyclohexylene group, and a dicyclohexylenemethyl group. Preferred is a dicyclohexylenemethyl group. In the above formula, p is a number from 1 to 10. p is the number of the carbodiimide groups existing in the above structural unit, and p may preferably be 2 or more in terms of curability, and the upper limit may preferably be 8 or less.

In the present description, repeat numbers, including the above p, are represented as average values.

The above Y can be represented by the following formula (b) or (c).

[Chemical Formula 8]

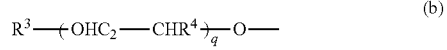

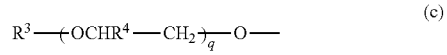

In the above formulas (b) and (c), $R^3$ may preferably be an alkyl group having 1 to 20 carbon atoms. Specific examples thereof include a methyl group, an ethyl group, a butyl group, a hexyl group, an octyl group, a decyl group, a dodecyl group, and a stearyl group. $R^4$ is a hydrogen atom or a methyl group, and may preferably be a hydrogen atom. q is a number from 4 to 40. In the above formulas (b) and (c), when $R^4$ is hydrogen, the formulas (b) and (c) represent the same structure.

The above Z is polymeric structure composed of an ether linkage, an ester linkage, or a carbonate linkage, and it is difficult to express Z by a general formula. In this regard, see the explanation for a bifunctional polyol having 200 to 5,000 that is described below.

A hydrophilicized carbodiimide compound (C) having two units of the above structural unit can be obtained by reacting a raw material carbodiimide compound having at least two isocyanate groups in its molecule with a bifunctional polyol having hydroxyl groups at its molecular ends and having a number-average molecular weight of 200 to 5,000 in such a ratio that the molar amount of the isocyanate groups of the raw material carbodiimide compound is larger than the molar amount of the hydroxyl groups of the polyol, and then further reacting the thus-obtained reaction product with a polyalkylene glycol monoalkyl ether.

From the viewpoint of reactivity, the raw material carbodiimide compound having at least two isocyanate groups in its molecule preferably has isocyanate groups at its both ends. A method for producing the raw material carbodiimide compound having isocyanate groups at its both ends is well known to these skilled in the art and, for example, a condensation reaction accompanied by a decarboxylation of an organic diisocyanate can be utilized.

As to the organic diisocyanate, specifically, aromatic diisocyanates, aliphatic diisocyanates, alicyclic diisocyanates, and mixtures thereof can be used, and specific examples thereof include 1,5-naphthylene diisocyanate, 4,4-diphenylmethane diisocyanate, 4,4-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, and tetramethylxylylene diisocyanate. From the viewpoint of reactivity, dicyclohexylmethane-4,4-diisocyanate may be preferred.

For the condensation reaction, a carbodiimidization catalyst is usually used. Specific examples of the carbodiimidization catalyst include phospholene oxides such as 1-phenyl-2-phospholene-1-oxide, 3-methyl-2-phospholene-1-oxide, 1-ethyl-2-phospholene-1-oxide, 3-methyl-1-phenyl-2-phospholene-1-oxide, and 3-phospholene isomers thereof. From the viewpoint of reactivity, 3-methyl-1-phenyl-2-phospholene-1-oxide may be preferred.

While the number-average molecular weight of the bifunctional polyol having hydroxyl groups at its both molecule ends is not particularly limited, it may preferably be 200 to 5,000 from the viewpoint of reaction efficiency. Specific examples of the bifunctional polyol having hydroxyl groups at its both molecule ends may include polyether diols, polyester diols, and polycarbonate diols. For example, polyalkylene glycols such as polyethylene glycol, polypropylene glycol, polyethylene propylene glycol, polytetramethylene ether glycol, polyhexamethylene ether glycol, and polyoctamethylene ether glycol; polyester diols such as polyethylene adipate, polybutylene adipate, polyhexamethylene adipate, polyneopentyl adipate, poly-3-methylpentyl adipate, polyethylene/butylene adipate, and polyneopentryl/hexyl adipate; polylactone diols such as polycaprolactone diol and poly-3-methylvalerolactone diol; polycarbonate diols such as polyhexamethylenecarbonate diol; and mixtures thereof can be mentioned.

The reaction of the raw material carbodiimide compound having at least two isocyanate groups in its molecule with the bifunctional polyol having hydroxyl groups at its molecular ends and having a number-average molecular weight of 200 to 5,000 is performed by reacting them in such a ratio that the molar amount of the isocyanate groups of the raw material carbodiimide compound is larger than the molar amount of the hydroxyl groups of the polyol. When the molar amount of the isocyanate groups is smaller than or equal to the molar amount of the hydroxyl groups, a reaction together with a polyalkylene glycol monoalkyl ether described below cannot be performed sufficiently.

The ratio between the molar amount of the isocyanate groups of the raw material carbodiimide compound and the molar amount of the hydroxyl groups of the polyol having hydroxyl groups at its molecular ends may preferably be 1.0:1.1 to 1.0:2.0 from the viewpoint of reaction efficiency and economical efficiency. A degree of polymerization of the raw material carbodiimide compound and the bifunctional polyol having hydroxyl groups at its both molecular ends in a reaction product obtained via this step may preferably be 1 to 10 from the viewpoint of reaction efficiency.

By further reacting the thus-obtained reaction product with a polyalkylene glycol monoalkyl ether, a hydrophilicized carbodiimide compound (C) having two units of the above structural unit can be obtained. As the polyalkylene glycol monoalkyl ether, a polyalkylene glycol monoalkyl ether represented by the following formula (b') or (c') is used.

[Chemical Formula 9]

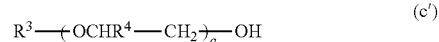

In the above formulas (b') and (c'), the contents described for $R^3$, $R^4$, and q in the preceding formulas (b) and (c) apply as they are. The type of $R^4$ and q in the above unit are set appropriately within the above ranges, respectively, in consideration of storage stability, dispersibility in water, and reactivity after volatilization of water. It is preferable from the viewpoint of dispersibility in water that $R^3$ in the monoalkoxypolyalkylene glycol be a methyl group and $R^4$ be a hydrogen atom. Moreover, from the viewpoint of dispersibility in water and reactivity after volatilization of water, the q may preferably be 4 to 20, and more preferably 6 to 12.

As the polyalkylene glycol monoalkyl ether, a polyalkylene glycol monoalkyl ether having a number-average molecular weight of 200 to 5,000 may preferably be used. The alkyl group of the polyalkylene glycol monoalkyl ether may preferably be an alkyl group having 1 to 20 carbon atoms. Specific examples of the polyalkylene glycol monoalkyl ether include those composed of polyethylene glycol, polypropylene glycol, or mixtures thereof each of which is capped at one end with an alkyl group having 1 to 20 carbon atoms. More detailed specific examples of such a polyalkylene glycol monoalkyl ether include polyethylene glycol monomethyl ether, polyethylene glycol mono-2-ethylhexyl ether, polyethylene glycol monolauryl ether, polypropylene glycol monomethyl ether, polypropylene glycol mono-2-ethylhexyl ether, and polypropylene glycol monolauryl ether, each having a number-average molecular weight of 200 to 5,000.

The reaction product and the polyalkylene glycol monoalkyl ether are reacted in such a ratio that the molar amount of the isocyanate groups of the reaction product is equal to or larger than the molar amount of the hydroxyl groups of the polyalkylene glycol monoalkyl ether. When the molar amount of the isocyanate groups is smaller than the molar amount of the hydroxyl groups, the reaction of the polyalkylene glycol monoalkyl ether with the reaction product cannot be carried out sufficiently. The molar amount of the isocyanate groups of the reaction product can be measured directly, and a value calculated from the charging formulation may be adopted.

In the reaction of the raw material carbodiimide compound with the bifunctional polyol having hydroxyl groups at its molecular ends and the reaction of the reaction product with the polyalkylene glycol monoalkyl ether, a catalyst may be used. The temperature during the reactions is not particularly limited, and from the viewpoint of control of the reaction system or reaction efficiency, the temperature may preferably be 60 to 120° C. In addition, an organic solvent free from active hydrogen may preferably be used in the reactions.

Such a two-step reaction can provide a hydrophilicized carbodiimide compound (C) having two units of the above structural unit. The thus-produced hydrophilicized carbodiimide compound (C) does not have only the structure of the formula (I) provided above, but is a mixture containing other various reaction products derived from the raw materials used. Generally, however, it may be considered to have the structure of the above formula (I).

One example of the hydrophilicized carbodiimide compound (C) having three units of the above structural unit is a compound represented by the following formula (II).

[Chemical Formula 10]

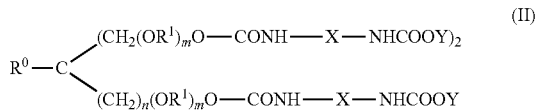

(II)

In the above formula (II), for X and Y, the description for X and Y made for the preceding one having two units of the above structural unit can apply as it is. $R^0$ is hydrogen, a methyl group, or an ethyl group. Each $R^1$ is an alkylene group having 4 or less carbon atoms, and may be either same or different. Specific alkylene groups include a methylene group, an ethylene group, a propylene group, and a butylene group. n is 0 or 1, and each m is a number from 0 to 60.

$R^0$, $R^1$, n and m are determined depending on a trifunctional polyol to be used for the production of the hydrophilicized carbodiimide compound (C).

When m is 11 or more, the ratio of a hydrophilic section to a hydrophobic section may preferably be 2.0 to 6.3. The ratio of the hydrophilic section to the hydrophobic section can be determined by dividing the molecular weight of the moiety of an oxymethylene group or an oxyethylene group existing in the carbodiimide compound by the molecular weight of the carbodiimide compound.

The hydrophilicized carbodiimide compound (C) having three units of the above structural unit can be obtained by reacting a raw material carbodiimide compound having at least two isocyanate group in one molecule with a polyalkylene glycol monoalkyl ether in such a ratio that the equivalent of the isocyanate groups of the raw material carbodiimide compound is larger then the equivalent of the hydroxyl groups of the polyalkylene glycol monoalkyl ether, and further reacting the resulting reaction product with a trifunctional polyol.

For the raw material carbodiimide compound having at least two isocyanate group in one molecule, the description made for the raw material carbodiimide compound of the hydrophilicized carbodiimide compound (C) having two units of the above structural unit applies a it is.

The reaction of the raw material carbodiimide compound with the polyalkylene glycol monoalkyl ether is required to make isocyanate groups remain in order to further react with a trifunctional polyol after the reaction. For this reason, it is necessary in the above reaction that the equivalent of the isocyanate groups is larger than the equivalent of the hydroxyl groups, and it may be preferred that the equivalent ratio of the isocyanate groups to the hydroxyl groups be 2/1. The reaction can usually be carried out under conditions well known to those skilled in the art, and a tin-based catalyst may be used, if necessary.

For the polyalkylene glycol monoalkyl ether, the description made for the polyalkylene glycol monoalkyl ether of the hydrophilicized carbodiimide compound (C) having two units of the above structural unit applies as it is.

Next, the thus-obtained reaction product is reacted with a trifunctional polyol. The amount of the trifunctional polyol to be used for the reaction may preferably be such an amount that the hydroxyl group equivalent is equal to or larger than the isocyanate equivalent in the reaction product, and more preferably, the isocyanate equivalent is equal to the hydroxyl group equivalent. The isocyanate equivalent in the reaction product not only can be measured directly but also can be determined by calculation from the blending ratio of the diisocyanate compound and the polyalkylene glycol monoalkyl ether in the preceding step. The reaction can be carried out in the same manner as the reaction of the raw material carbodiimide compound with the polyalkylene glycol monoalkyl ether described previously.

The trifunctional polyol may preferably be trimethylolpropane, glycerol, or an alkylene oxide adduct of these because of its easy availability. Examples of the alkylene oxide include ethylene oxide and propylene oxide. An alkylene oxide adduct of glycerol is commercially available from Sanyo Chemical Industries, Ltd. as GP Series. In consideration of the curing reactivity of a three-chain type hydrophilic carbodiimide compound to be obtained, one is particularly preferred in which alkylene oxide has been added to every hydroxyl group. Of the aforementioned GP Series, GP-250 and GP-3000 are mentioned as those having such a structure.

Such a two-step reaction can provide a hydrophilicized carbodiimide compound (C) having three units of the above structural unit. The thus-provided hydrophilicized carbodiimide compound (C) does not have only the structure of the formula (II) described above, but it may be considered to have the structure of the above formula (II).

One example of the hydrophilicized carbodiimide compound (C) having one unit of the above structural unit is a compound represented by the following formula (III), $$\text{YOCONH}-\text{X}-\text{NHCOOY} \quad \text{(III)}$$

wherein X is a bifunctional organic group having at least one carbodiimide group, and Y is each same or different structure resulting from elimination of a hydroxyl group from a polyalkylene glycol monoalkyl ether.

X in the formula (III) is a group that can be represented by formula (a) in the above formula (I).

Each Y in the formula (III) is a structure resulting from elimination of hydroxyl groups from same or different polyethylene glycol monoalkyl ethers. The Y can represent the same structure of the Y in the above-described formula (I). Use of the hydrophilicized carbodiimide compound (C) represented by the formula (III) offers an advantage that a crosslinking density can be held at a higher level. Conceivable reasons for this are that in the formulas (I) and (II) in which there are a plurality of carbodiimide units, the efficiency of the reaction with an acid is low under a low acid value of an aqueous resin and that the crosslinking of the hydroxyl groups of the aqueous resin and the isocyanate is not disturbed because the formula (III) does not have a bulky structure unlike the formulas (I) and (II). Accordingly, it is considered that the crosslinking density of the hydrophilicized carbodiimide compound (C) represented by the formula (III) becomes high for these reasons.

The Y in the formula (III) is preferably same or different structure selected from the following (i) or (ii):

(i) a structure resulting from elimination of a hydroxyl group from a polyethylene glycol monoalkyl ether in which an alkyl group having 1 to 3 carbon atoms is ether-linked to an end of a polyethylene oxide unit having a repeat number of 6 to 20, (ii) a structure resulting from elimination of a hydroxyl group from a polypropylene glycol monoalkyl ether in which an alkyl group having 1 to 8 carbon atoms is ether-linked to an end of a polypropylene oxide unit having a repeat number of 4 to 60.

More preferably, the repeat number of the polypropylene oxide units of the above (ii) is 15 to 60.

Use of the hydrophilicized carbodiimide compound (C) represented by the formula (III) and having the above (i) and (ii) offers an advantage that excellent dispersibility in water is attained and stability is improved and crosslinking density is held at a higher level.

The hydrophilicized carbodiimide compound (C) represented by the formula (III) can be prepared by reacting same or different polyalkylene glycol monoalkyl ethers with the raw material carbodiimide compound obtained through the above-described condensation reaction accompanied by decarbonization of an organic diisocyanate.

The polyalkylene glycol monoalkyl ether is more preferably a polyethylene glycol monoalkyl ether in which an alkyl group having 1 to 3 carbon atoms is ether-linked to an end of a polyethylene oxide unit having a repeat number of 6 to 20, or a polypropylene glycol monoalkyl ether in which an alkyl group having 1 to 8 carbon atoms is ether-linked to an end of a polypropylene oxide unit having a repeat number of 4 to 60. In the preparation of the hydrophilicized carbodiimide compound (C) represented by the formula (III), such a polyethylene glycol monoalkyl ether and such a polypropylene glycol monoalkyl ether may be used either singly or in combination.

Specific examples of the polyethylene glycol monoalkyl ether include polyethylene glycol monomethyl ether, polyethylene glycol monoethyl ether, and polyethylene glycol monopropyl ether, and especially, polyethylene glycol monomethyl ether is suitable.

Specific examples of the polypropylene glycol monoalkyl ether include polypropylene glycol monomethyl ether, polypropylene glycol monoethyl ether, polypropylene glycol monobutyl ether, and polypropylene glycol 2-ethylhexyl ether, and especially, polypropylene glycol monobutyl ether is suitable.

In the hydrophilicized carbodiimide compound (C) represented by the above formula (III), it is preferable that one Y is (i) and the other Y is (ii), and the ratio of (i) a structure resulting from elimination of a hydroxyl group from a polyethylene glycol monoalkyl ether in which an alkyl group having 1 to 3 carbon atoms is ether-linked to an end of a polyethylene oxide unit having a repeat number of 6 to 20 and (ii) a structure resulting from elimination of a hydroxyl group from a polypropylene glycol monoalkyl ether in which an alkyl group having 1 to 8 carbon atoms is ether-linked to an end of a polypropylene oxide unit having a repeat number of 4 to 60 is within a range of (i):(ii)=1:0.7 to 1:8.

In the hydrophilicized carbodiimide compound (C) represented by the formula (III), it is preferable that the surrounding of the carbodiimide group is hydrophobic to a certain degree in order to enhance water resistance when a coating film is formed. Moreover, in order to suppress the deactivation of carbodiimide by water and to keep stability, it is preferable that the surrounding of the carbodiimide group is hydrophobic to a certain degree and the contact with water molecules is kept low. On the other hand, in the hydrophilicized carbodiimide compound (C) represented by the formula (III), the compound is required to have a polyethylene glycol structure in a certain amount in order to maintain hydrophilicity. When the above structures (i) and (ii) are present in a ratio within the range of (i):(ii)=1:0.7 to 1:8, the hydrophobicity can be kept at a certain degree at the surrounding of the carbodiimide group, while the hydrophilicity of the carbodiimide compound is secured. This offers an advantage that an aqueous coating composition superior in low-temperature curability and also superior in coating material stability can be obtained. The ratio (i):(ii) may more preferably be within the range of (i):(ii)=1:0.7 to 1:1.5.

A content of the hydrophilicized carbodiimide compound (C) contained in the aqueous coating composition of the present invention may preferably be 1 to 8% by mass, more preferably 1.5 to 7% by mass, and even more preferably 2 to 6% by mass, relative to the resin solid content of the aqueous coating composition. When the content of the hydrophilicized carbodiimide compound (C) is less than 1% by mass, a water resistance improvement effect may not be obtained. When the content of the hydrophilicized carbodiimide compound (C) exceeds 8% by mass, water-resistant shrinkage may be poor.

The inclusion of both the water-dispersible blocked polyisocyanate compound (B) and the hydrophilicized carbodiimide compound (C) in the aqueous coating composition of the present invention improves the water resistance of a coating film to be obtained or the like, while the low-temperature curability is secured. A mass ratio of the contents of the water-dispersible blocked polyisocyanate compound (B) and the hydrophilicized carbodiimide compound (C) relative to the resin solid content of the aqueous coating composition may preferably be (B):(C)=25:1 to 1.25:1, and more preferably 10:1 to 2:1.

In the present invention, by using the water-dispersible blocked polyisocyanate compound (B) and the hydrophilicized carbodiimide compound (C) together with the aqueous resin having a hydroxyl group and a carboxyl group (A) having a hydroxyl value of 80 to 200 mgKOH/g and an acid value of 10 to 40 mgKOH/g, it is possible to prepare a one-component aqueous coating composition that is excellent in dispersibility in water and water dispersion stability and also excellent in low-temperature curability. In the present invention, the aqueous resin (A) has an acid group and the acid value thereof falls within the above range, and thus, coating material stability as a one-component aqueous coating composition and excellent water resistance due to the reaction with the hydrophilicized carbodiimide compound (C) during curing are exhibited. Moreover, the aqueous coating composition of the present invention contains the water-dispersible blocked polyisocyanate compound (B) capable of reacting with the hydroxyl groups of the aqueous resin (A), and thus, a coating film excellent in coating film properties is obtained and coating material stability as a one-component aqueous coating composition is excellent. Here, the fact that the mass ratio between the content of the water-dispersible blocked polyisocyanate compound (B) and the content of the hydrophilicized carbodiimide compound (C) is within the above range offers an advantage that coating material stability as a one-component aqueous coating composition is improved and effects such as water resistance of a coating film, and the like are also improved.

Aqueous Polyurethane Resin (D)

The aqueous coating composition of the present invention contains the aqueous polyurethane resin (D) in addition to the above components (A) to (C). The aqueous polyurethane resin (D) is a polymer obtained by using a polyol compound (D-1), a compound having an active hydrogen group and a hydrophilic group in the molecule (D-2), an organic polyisocyanate (D-3), and, if necessary, a chain extender and a polymerization terminator, and can be prepared by dissolving or dispersing a resulting polymer in water.

The polyol compound (D-1) is not particularly limited as long as it is a polyol compound having two or more hydroxyl groups. Examples of the polyol compound (D-1) include polyhydric alcohols such as ethylene glycol, propylene glycol, 1, -butanediol, 1,6-hexanediol, trimethylolpropane, and glycerol; polyether polyols such as polyethylene glycol, polypropylene glycol, and polytetramethylene ether glycol; polyester polyols obtained from a dicarboxylic acid such as adipic acid, sebacic acid, itaconic acid, maleic anhydride, phthalic acid, and isophthalic acid, and a glycol such as ethylene glycol, triethylene glycol, propylene glycol, butylene glycol, tripropylene glycol, and neopentyl glycol; polycaprolactone polyol; polybutadiene polyol; polycarbonate polyol; and polythioether polyol. The polyol compound (D-1) may be used singly, or two or more species thereof may be used in combination. The polyol compound (D-1) may preferably have a number-average molecular weight of 500 to 5000.

Examples of the compound having an active hydrogen group and a hydrophilic group in the molecule (D-2) include compounds known as compounds containing active hydrogen and an anionic group (an anionic group or an anion-forming group (a group that react with a base to form an anionic group and, in this case, that is converted into an anionic group by neutralizing with a base before, during, or after a urethanization reaction)) (those disclosed in JP-B-S42 (1967)-24192 and JP-B-S55 (1950)-41607; specific examples include dimethylolalkanoic acids such as α,α-dimethylolpropionic acid, α,α-dimethylolbutyric acid, and dimethylolacetic acid), compounds known as compounds having active hydrogen and a cationic group in the molecule (e.g., those disclosed in JP-B-S43 (1968)-9076), and compounds known as compounds having active hydrogen and a nonionic group (e.g., those disclosed in JP-B-S48 (1978)-41718; specifically, polyethylene glycol and alkylalcohol alkylene oxide adducts, etc.). It may be preferred to use a dimethylolalkanoic acid as the compound having an active hydrogen group and a hydrophilic group in the molecule (D-2).

The organic polyisocyanate (D-3) is not particularly limited as long as it has two or more isocyanate groups in the molecule. Specific examples of the organic polyisocyanate (D-3) include:
aliphatic diisocyanates having 2 to 12 carbon atoms such as hexamethylene diisocyanate, 2,2,4-trimethylhexane diisocyanate, and lysine diisocyanate;
alicyclic diisocyanates having 4 to 18 carbon atoms such as 1,4-cyclohexane diisocyanate, isophorone diisocyanate, 4,4'-dicyclohexylmethane diisocyanate, methylcyclohexylene diisocyanate, and isopropylidenecyclohexyl-4,4'-diisocyanate;
aromatic diisocyanates such as 2,4-toluylene diisocyanate, 2,6-toluylene diisocyanate, diphenylmethane-4,4'-diisocyanate, 1,5'-naphthene diisocyanate, tolidine diisocyanate, diphenylmethylmethane diisocyanate, tetraalkyldiphenylmethane diisocyanate, xylylene diisocyanate, tetramethylxylylene diisocyanate, 4,4'-dibenzyl diisocyanate, and 1,3'-phenylene diisocyanate; and
triisocyanates such as lysine ester triisocyanate, triphenylmethane triisocyanate, 1,6,11-undecane triisocyanate, 1,8-diisocyanate-4,4-isocyanatemethyloctane, 1,3,6-hexamethylene triisocyanate, and bicycloheptane triisocyanate.

These polyisocyanates may be used in the form of dimer or trimer thereof (isocyanurate linkage), and may be reacted with an amine and used as a biuret. Moreover, it is also possible to use polyisocyanates having a urethane linkage resulting from reacting such polyisocyanate compounds with polyols.

It may be more preferred to use an aliphatic diisocyanate as the organic polyisocyanate (D-3). Preparation of the aqueous polyurethane resin (D) using an aliphatic diisocyanate offers an advantage that the water permeability of a coating film to be obtained can be adjusted to a proper range and good low-temperature initial water resistance can be obtained.

The chain extender that can be used if necessary in the preparation of the aqueous polyurethane resin (D) is not particularly limited as long as it has two or more active hydrogen groups, and examples thereof include low molecular weight polyols (number-average molecular weight of less than 500) and polyamines. Examples of the low molecular weight polyols include ethylene glycol, propylene glycol, 1,4-butanediol, 3-methylpentanediol, 2-ethyl-1,3-hexanediol, and trimethylolpropane. Examples of the polyamines include ethylenediamine, hexamethylenediamine, diethylenetriamine, hydrazine, xylylenediamine, and isophoronediamine.

Examples of the polymerization terminator include a compound having one active hydrogen in its molecule, and a monoisocyanate compound.

Examples of the compound having one active hydrogen in its molecule include monoalcohols (e.g., alkyl alcohols such as methanol, butanol and octanol, alkyl alcohol alkylene oxide adducts), and monoamines (e.g., alkylamines such as butylamine and dibutylamine).

Examples of the monoisocyanate compound include methylisocyanate, ethylisocyanate, propylisocyanate, butylisocyanate, laurylisocyanate, cyclohexylisocyanate, phenylisocyanate, and tolyleneisocyanate.

A reaction method in producing the aqueous polyurethane resin (D) may be any method of a one-shot method in which the respective components are reacted at once, and a multistage method in which the respective components are reacted in steps (a method of producing the resin by reacting part of an active hydrogen-containing compound (e.g., macromolecular polyol) with a polyisocyanate, thereby forming an NCO terminated prepolymer, and then reacting the remainder of the active hydrogen-containing compound). The reaction of synthesizing the aqueous polyurethane resin (D) is performed usually at 40 to 140° C., preferably 60 to 120° C. In order to accelerate the reaction, there may be used a catalyst that is usually used for a urethanization reaction, such as a tin-based catalyst including dibutyltin laurate and tin octylate or an amine-based catalyst including triethylenediamine. In addition, the above reaction may be carried out in an organic solvent that is inert to isocyanate (e.g., acetone, toluene, dimethylformamide, etc.), and the solvent may be added either during the reaction or after the reaction.

The aqueous polyurethane resin (D) in the present invention can be prepared by treating a resulting polymer with a known method (a method of forming an anionic group by neutralization with a base in the case of an anion-forming group, a method of forming a cationic group with a quaternarizing agent or a method of forming a cationic group by neutralization with an acid in the case of a cation-forming group) and then dispersing the polymer in water.

The step of dissolving the polymer in water is not particularly limited, and it may be performed either after the reaction or at a stage during the course of the multistage method. For example, when dissolving the polymer in water at the stage of an NCO terminated prepolymer, the aqueous polyurethane resin (D) is obtained by dissolving the polymer in water while extending the chain with water and/or a polyamine.

When using an organic solvent inert to the isocyanate, solvent removal may be carried out after dissolving the polymer in water.

The aqueous polyurethane resin (D) in the present invention is required to have a glass transition point (Tg) of $-50°$ C. or less and a cured film of the aqueous polyurethane resin (D) is required to have an elongation at break of 400% or more at $-20°$ C.

When the glass transition point (Tg) of the aqueous polyurethane resin (D) exceeds $-50°$ C., a coating film to be obtained will be poor in chipping resistance and water resistance. The glass transition point (Tg) may more preferably be $-55°$ C. or less, and even more preferably $-58°$ C. or less. The glass transition point (Tg) of the aqueous polyurethane resin (D) can be measured using a differential scanning calorimeter.

When the cured film of the aqueous polyurethane resin (D) has an elongation at break of less than 400% at $-20°$ C., a coating film to be obtained will be poor in chipping resistance and water resistance. The elongation at break may more preferably be 500% or more.

The elongation at break of the cured film of the aqueous polyurethane resin (D) can be determined in accordance with JIS K7127. Specifically, 95 parts by mass (resin solid content amount) of the aqueous polyurethane resin (D) and 5 parts by mass (resin solid content amount) of the hydrophilicized carbodiimide compound (C) are mixed. The resulting mixture is applied uniformly with a doctor blade such that the dry film thickness is 20 μm. After leaving at rest at 20° C. for 10 minutes, the resulting mixture is preheated at 80° C. for 3 minutes, thereby volatilizing water. Then, the resulting mixture is baked at 120° C. for 30 minutes, and thus a cured film is prepared. The resulting cured film is subjected to a tensile performance test at a testing temperature of $-20°$ C. in accordance with JIS K7127 and an elongation ratio at the time of breaking is measured. The obtained elongation ratio is taken as an elongation at break.

As the aqueous polyurethane resin (D), a commercially available product may be used. Examples of the commercially available product include Neo Rez Series, which are aqueous polyurethane resins available from Kusumoto Chemicals, Ltd., HUX Series, which are aqueous polyurethane resins available from ADEKA Corporation, and UCOAT Series, PERMARIN Series, and U-Prene Series, which are aqueous polyurethane resins available from Sanyo Chemical Industries, Ltd.

The content of the aqueous polyurethane resin (D) may preferably be 15% by mass or more, relative to the resin solid content of the aqueous coating composition. That the content of the aqueous polyurethane resin (D) is 15% by mass or more offers an advantage that a coating film excellent in chipping resistance, water-resistance adhesion, etc. can be obtained.

A content of the aqueous polyurethane resin (D) may be chosen appropriately according to the type of the coating film. For example, when the aqueous coating composition is used as an intermediate coating composition, the content of the aqueous polyurethane resin (D) may preferably be 30% by mass or more and 40% by mass or less relative to the resin solid content of the aqueous coating composition. When the aqueous coating composition is used as a top base coating composition, the content of the aqueous polyurethane resin (D) is more preferably 15% by mass or more and less than 30% by mass relative to the resin solid content of the aqueous coating composition.

Other Resins

The aqueous coating composition of the present invention may contain a resin component (other resin) other than the aqueous resin having a hydroxyl group and a carboxyl group (A), if necessary. One example of such other resin includes a resin that is prepared in the same manner as the aqueous resin having a hydroxyl group and a carboxyl group (A) and that has a hydroxyl value of less than 80 mgKOH/g. Examples of such other resin include resins having a hydroxyl group, such as polyether diol and polycarbonate diol, and melamine resin having a methylol group.

Such other resin can be used in an arbitrary amount, provided that functions (water resistance, chipping resistance, etc.) of the aqueous coating composition of the present invention are not damaged.

Moreover, for example, when being a top coating composition, the aqueous coating composition may preferably contain a resin prepared in the same manner as the above-described aqueous resin having a hydroxyl group and a carboxyl group (A) and having a hydroxyl value of less than 80 mgKOH/g within a range of 15 to 45% by mass relative to the resin solid content of the aqueous coating composition.

Aqueous Coating Composition

The aqueous coating composition of the present invention is an aqueous coating composition comprising:
an aqueous resin having a hydroxyl group and a carboxyl group (A),
a water-dispersible blocked polyisocyanate compound (B),
a hydrophilicized carbodiimide compound (C), and
an aqueous polyurethane resin (D). If necessary, the aqueous coating composition of the present invention may contain, in addition to the above-mentioned components (A) to (D), other resin described above, a pigment, a curing catalyst, a surface conditioner, an antifoaming agent, a pigment dispersing agent, a plasticizer, a film-forming assistant, an ultraviolet absorber, an antioxidant, etc. The aqueous coating composition of the present invention can be prepared by mixing the respective components to constitute the coating composition with a means that is usually used.

Generally, a resin solid concentration of the aqueous coating composition of the present invention may preferably be set to 15 to 60% by mass though it varies depending on the application condition.

Method for Forming a Coating Film

The present invention further provides a method for forming a coating film in use of the above-described aqueous coating composition. This method comprises:
a coating step of applying the aqueous coating composition to an object to be coated to form a coating film, and
a curing step of curing the resulting coating film.

The aqueous coating composition of the present invention is characterized in that a coating film excellent in coating film properties can be obtained therefrom even under low-temperature curing conditions. The curing conditions in the curing step may be low-temperature curing conditions of, for example, 100° C. or less, and more specifically, may be curing conditions of 70 to 100° C., more preferably 70 to 90° C.

On the other hand, the aqueous coating composition of the present invention does not exclude an embodiment in which the film is cured at a temperature of 100° C. or more. For example, the film may be cured at 100 to 120° C. depending on the type and shape of the object to be coated.

Object to be Coated

Examples of the object to be coated in the above method include steel plates of metal such as iron, steel, stainless steel, aluminum, copper, zinc, and tin and alloys thereof; resins such as polyethylene resin, EVA resin, polyolefin resins (polyethylene resin, polypropylene resin, etc.), vinyl chloride resin, styrol resin, polyester resins (including PET resin, PET resin, etc.), polycarbonate resin, acrylic resin, acrylonitrile-butadiene-styrene (ABS) resin acrylonitrile-styrene (AS) resin, polyamide resin, acetal resin, phenol resin, fluororesin, melamine resin, urethane resin, epoxy resin, and polyphenylene oxide (PPO); and organic-inorganic hybrid materials. These may have been molded.

The steel plate may be in a state where an electrodeposition coating film is formed after being subjected to a chemical conversion treatment. Examples of the chemical conversion treatment include zinc phosphate conversion, zirconium conversion, and chromic acid conversion. Examples of the electrodeposition coating film include electrodeposition coating films obtained by electrodeposition using a cationic electrodeposition coating composition and an anionic electrodeposition coating composition.

The resin may, if necessary, have been subjected to vapor cleaning using an organic solvent or may have been subjected to cleaning using a neutral detergent. Moreover, the resin may have been subjected to primer coating according to necessity.

The aqueous coating composition of the present invention is characterized in that it can provide a coating film excellent in coating film properties even under low-temperature curing conditions. Therefore, the object to be coated for which the method of the present invention can be used suitably may be, for example, an object to be coated including a steel plate part and a resin part. The aqueous coating composition of the present invention is applied to the object to be coated to form a coating film, so that it becomes possible to form a coating film having good physical properties at both the resin part and the steel plate part without applying heat by which thermal distortion of the resin part will be caused. By use of the aqueous coating composition of the present invention, a common coating composition can be applied even to different materials, namely, resin and steel plate. This offers an advantage that the hues of the coating films to be formed can be matched at a higher level.

Examples of other object to be coated that is suitable as the object to be coated to which the aqueous coating composition of the present invention is applied include industrial machines and construction machines. Industrial machines and construction machines are generally large and have a feature that their constituting base materials (steel plates) are thick as compared with automobile bodies in order to withstand a large load. Therefore, when such an industrial machine or a construction machine is the object to be coated, the object to be coated is large in heat capacity and there is a problem that heat is not transferred sufficiently to the object to be coated in a heating oven. The aqueous coating composition of the present invention is characterized in that it is curable at low temperatures and in that a coating film having a high crosslinking density can be obtained even when the aqueous coating composition is cured at a low temperature. Therefore, the aqueous coating composition of the present invention can be used suitably also for application to objects to be coated which are large in heat capacity and difficult to be subjected to high-temperature heat curing treatment after application, namely, industrial machines and construction machines. In the application to such objects to be coated, there is an embodiment in which the aqueous coating composition of the present invention is applied by an application method usually used by those skilled in the art and then the composition is heated, for example, at 70 to 100° C. for 10 minutes to 2 hours, thereby forming a cured coating film.

One embodiment of the method for forming a coating film in the present invention includes an embodiment comprising:

a first coating step of applying the intermediate coating composition onto an object to be coated to form a first coating film, and a second coating step of applying the aqueous coating composition onto the first coating film to form a second coating film.

The intermediate coating composition and the aqueous base coating composition can be applied by an application method usually used. For example, when the intermediate coating composition and the aqueous base coating composition are applied to an automobile body, they can be applied by multi-stage application, preferably two stage application with use of air-electrostatic spray, or alternatively, there can be used an application method combining air electrostatic spray and a rotary atomization type electrostatic applicator, which is so-called "μμ (micro micro) bell", "μ (micro) bell", "metallic bell" or the like, in order to improve the appearance of a resulting coating film.

The thickness of the coating film of the aqueous intermediate coating composition may be chosen appropriately according to the desired use. The film thickness may preferably be 15 to 35 μm, and more preferably 15 to 30 μm, for example.

The thickness of the coating film of the aqueous base coating composition can be chosen appropriately according to the desired use. The film thickness may preferably be 10 to 30 μm, for example.

The method for forming a coating film of the present invention also includes an embodiment in which in a state where the second coating film is still uncured, a clear coating composition is further applied, thereby forming a clear coating film, and then an uncured multilayer coating film is cured. This method can omit a baking drying oven and therefore may be preferable from economical viewpoint and environmental protection viewpoint.

Examples of the clear coating composition that can be used suitably in the above coating step include a urethane clear coating composition. Examples of the urethane clear coating composition include clear coating compositions containing a hydroxyl group-containing resin and an isocyanate compound curing agent. The isocyanate compound as a curing agent is not particularly limited, and examples thereof include aliphatic isocyanates such as trimethylene diisocyanate, tetramethylene diisocyanate, pentamethylene diisocyanate, hexamethylene diisocyanate (HDI), and trimethylhexamethylene diisocyanate; aliphatic cyclic isocyanates such as 1,3-cyclopentane diisocyanate, 1,4-cyclohexane diisocyanate, and 1,2-cyclohexane diisocyanate; aromatic isocyanates such as xylylene diisocyanate (XDI), 2,4-tolylene diisocyanate (TDI), and 2,6-tolylene diisocyanate; alicyclic isocyanates such as isophorone diisocyanate (IPDI) and norbornane diisocyanate; multimers such as biuret type and nurate type of these isocyanates; and mixtures thereof.

The hydroxyl value of the hydroxyl group-containing resin may preferably be within a range of 20 to 200 mgKOH/g. When the hydroxyl value exceeds the upper limit, the water resistance of a coating film will deteriorate, and when the hydroxyl value is less than the lower limit, the curability of a coating film will deteriorate. The lower limit may more preferably be 30 mgKOH/g, and the upper limit may more preferably be 180 mgKOH/g.

The number-average molecular weight of the hydroxyl group-containing resin may preferably be within a range of 1000 to 20000. When the number-average molecular weight is less than 1000, the workability and the cureability may be insufficient. When the number-average molecular weight exceeds 20000, a nonvolatile portion during coating will be decreased and the workability may deteriorate. The lower limit may more preferably be 2000 and the upper limit may more preferably be 15000.

Moreover, the hydroxyl group-containing resin may preferably have an acid value within a range of 2 to 30 mgKOH/g. When the acid value exceeds the upper limit, the water resistance of a coating film will deteriorate, and when the acid value is less than the lower limit, the curability of a coating film will deteriorate. The lower limit may more preferably be 3 mgKOH/g, and the upper limit may more preferably be 25 mgKOH/g.

A content of the isocyanate compound relative to the hydroxyl group-containing resin may be chosen suitably within a range usually used by those skilled in the art. For example, it is preferable to use the isocyanate compound in such an amount that an equivalent ratio of isocyanate groups (NCO) to hydroxyl groups (OH) (NCO/OH) falls within the range of 0.5 to 1.7. The lower limit may more preferably 0.7, and the upper limit may more preferably 1.5.

A method for producing the clear coating composition is not particularly limited and a method well-known to those skilled in the art may be used. The clear coating composition to be used may be a commercially available product. Examples of the commercially available product include Polyure Excel O-1100 Clear and O-1200 Clear (produced by Nippon Paint Automotive Coatings Co., Ltd., isocyanate-curing type clear coating compositions).

When using the clear coating composition, a multilayer coating film can be formed by applying the aqueous coating composition of the present invention, thereby forming an uncured coating film (including both an embodiment to form a single coating film and an embodiment to form the first coating film and the second coating film), and then applying the clear coating composition by wet-on-wet, and subsequently baking and curing the clear coating composition at 70 to 100° C., preferably 70 to 90° C., for 10 to 30 minutes.

In the present invention, according to a kind of materials of the object to be coated, a clear coating composition other than the above-mentioned urethane clear coating composition can be used. For example, an acid epoxy curable type clear coating composition, an acrylic-melamine curable type clear coating composition, etc. may be used. Examples of such clear coating compositions include "Macflow O-570 Clear" and "Macflow O-1820 Clear" available from Nippon Paint Automotive Coatings Co., Ltd., which are clear coating compositions containing a polyepoxide and a polyacid, and "Super rack O-100 Clear" (trade name) available from Nippon Paint Automotive Coatings Co., Ltd., which is a clear coating composition containing an acrylic resin and melamine curing agent. The heat curing conditions for the case of using such clear coating compositions may be chosen appropriately according to the composition of the respective clear coating compositions. One example of the heat curing conditions for the case of using such clear coating compositions includes a condition of heating at 120 to 140° C. for 10 to 30 minutes.

As a method for applying the clear coating composition, the above-described known coating method can be used, and for example, the composition can be applied with an air spray, electrodeposition, or the like. The clear coating composition may preferably be applied so that the dry film thickness is generally 10 to 80 μm, preferably 20 to 50 μm.

EXAMPLES

The present invention will be described more specifically with reference to the following examples, but the present invention is not limited to the examples. In the examples, "parts" and "%" are on a mass basis unless otherwise indicated.

Production Example 1

Production of Acrylic Emulsion Having Hydroxyl Group and Carboxyl Group

A reaction vessel equipped with a stirrer, a nitrogen inlet tube, a temperature controller, a condenser, and a dropping funnel was charged with 1,000 parts of deionized water, and was then heated to 80° C. with stirring under nitrogen atmosphere.

A pre-emulsion prepared by adding to 1,000 parts of deionized water 103 part of styrene, 290 parts of n-butyl methacrylate, 280 parts of n-butyl acrylate, 302 parts of hydroxyethyl acrylate, 26 parts of acrylic acid, 3 parts of dodecyl mercaptan, and 100 parts of LATEMUL PD-104 (produced by Kao Corporation. 20% aqueous solution) as an emulsifier and then emulsifying them was dropped over 2 hours together with an aqueous initiator solution prepared by dissolving 3 parts of ammonium persulfate in 300 parts of deionized water.

After the completion of the dropping, the reaction was continued at 80° C. for 1 hour, followed by cooling, and 8.2 parts of N,N-dimethylaminoethanol was added and thus an acrylic emulsion having a resin solid content of 30% by mass was obtained. The hydroxyl value of the acrylic emulsion, in terms of resin solid content, calculated from the monomer composition was 130 mgKOH/g and the acid value was 20 mgKOH/g. The acrylic resin in the resulting acrylic emulsion had a number-average molecular weight of 45,000 as determined by GPC measurement after removing water.

Production Example 2

Production of Acrylic Emulsion having Hydroxyl Group and Carboxyl Group

Polymerization was carried out in the same manner as in Production Example 1 except that the amounts of monomers in the monomer mixture were changed to 90 parts for styrene, 249 parts for n-butyl acrylate, 403 parts for n-butyl methacrylate, 232 parts for hydroxyethyl acrylate, 26 parts for acrylic acid, and 3 parts for dodecyl mercaptan, and then 8.2 parts of N,N-dimethylaminoethanol was added, and thus an acrylic emulsion having a resin solid content of 30% by mass was obtained. The hydroxyl value of the acrylic emulsion, in terms of resin solid content, calculated from the monomer composition was 100 mgKOH/g and the acid value was 20 mgKOH/g. The acrylic resin in the resulting acrylic emulsion had a number-average molecular weight of 43,000 as determined by GPC measurement after removing water.

Production Example 3

Production of Aqueous Acrylic Dispersion Having Hydroxyl Group and Carboxyl Group A reaction vessel equipped with a stirrer, a nitrogen inlet tube, a temperature controller, a condenser, and a dropping funnel was charged with 712 parts of 2-methoxy -1-propanol, and was then heated to 120° C. with stirring under nitrogen atmosphere.

A monomer mixture of 50 parts of styrene, 20 parts of 2-ethylhexyl acrylate, 122 parts of 2-ethylhexyl methacrylate, 426 parts of n-butyl methacrylate, and 182 parts of hydroxyethyl methacrylate was dropped over 1.5 hours together with an initiator solution prepared by dissolving 24 parts of Kayaester O (tert-butyl peroxy-2-ethylhexanoate produced by Kayaku Akzo Corporation) in 160 parts of 2-methoxy-1-propanol.

After the completion of the dropping, the temperature was held at 120° C. for 1 hour, and subsequently, a monomer mixture of 50 parts of n-butyl methacrylate, 119 parts of hydroxyethyl methacrylate, and 31 parts of acrylic acid was dropped over 1 hour together with an initiator solution prepared by dissolving 6 parts of Kayaester O in 40 parts of 2-methoxy-1-propanol.

After the completion of the dropping, the temperature was held at 120° C. for 0.5 hours, and then an initiator solution prepared by dissolving 3 parts of Kayaester O in 55 parts of 2-methoxy-1-propanol was dropped over 0.5 hours as a post-shot, followed by stirring at 120° C. for 1 hour, and thus an acrylic resin having a resin solid content of 50% by mass and a number-average molecular weight of 6,000 as determined by GPC measurement was obtained.

After evaporating the solvent by heating under reduced pressure, 39 parts of N,N-dimethylaminoethanol was added and further 1206 parts of deionized water was fed, followed by stirring, and thus an aqueous acrylic resin dispersion having a resin solid content of 45% by mass was obtained. The hydroxyl value of the aqueous acrylic dispersion, in terms of resin solid content, calculated from the monomer composition was 130 mgKOH/g and the acid value was 24 mgKOH/g.

Production Example 4

Production of Aqueous Polyester Dispersion Having a Hydroxyl Group and Carboxyl Group A reaction vessel equipped with a stirrer, a nitrogen inlet tube, a temperature controller, a condenser, and a decanter was charged with 250 parts of trimethylolpropane, 824 parts of adipic acid, and 635 parts of cyclohexandicarboxylic acid, then the mixture was heated to 180° C., and then a condensation reaction was carried out until no more water distilled out. After cooling to 60° C., 120 parts of phthalic anhydride was added and the mixture was heated to 140° C. and held for 60 minutes, and thus a polyester resin having a number-average molecular weight of 2,000 as determined by GPC measurement was obtained. Fifty nine parts of dimethylaminoethanol (corresponding to 80% of the acid value of the resin (neutralization ratio: 80%)) was added at 80° C., and 1920 parts of deionized water was further added, followed by stirring, and thus an aqueous polyester dispersion having a resin solid content of 45% by mass was obtained. The hydroxyl value of the aqueous polyester dispersion in terms of resin solid content was 90 mgKOH/g and the acid value was 35 mgKOH/g.

Production Example 5

Preparation of Hydrophilicized Carbodiimide Compound (1)

By reacting 700 parts of 4,4-dicyclohexylmethane diisocyanate with 7 parts of 3-methyl-1-phenyl-2-phospholene-1-oxide at 170° C. for 7 hours, obtained was a carbodiimide compound with the structure represented by the above formula (a), the carbodiimide compound having three carbodiimide groups in one molecule and having isocyanate groups at its both ends.

Next, to 180 parts of the produced 4,4-dicyclohexylmethanecarbodiimide having isocyanate ends, were added 95 parts of PTMG-1000 (polytetramethylene glycol having a number-average molecular weight of 1,000 produced by Mitsubishi Chemical; repeat number of tetramethylene oxide calculated from number-average molecular weight was 13.6) and 0.2 parts of dibutyltin dilaurate, and the mixture was then heated to 85° C. and held for 2 hours.

Subsequently, 86.4 parts of Methyl Poly Glycol 130 (polyethylene glycol monomethyl ether produced by Nippon Nyukazai Co., Ltd.; repeat number of ethylene oxide calculated from hydroxyl value of 130 mgKOH/g was 9) was added and then the mixture was held at 85° C. for 3 hours. After confirming disappearance of a peak of NCO by IR measurement, the reaction was finished, followed by cooling to 60° C., and then deionized water was added, and thus an aqueous dispersion of a hydrophilicized carbodiimide compound (1) having a resin solid content of 40% by mass was obtained. The resulting hydrophilicized carbodiimide compound was a compound represented by the above formula (I).

Production Example 6

Preparation of Hydrophilicized Carbodiimide Compound (2)

To 90 parts of the 4,4-dicyclohexylmethanecarbodiimide having isocyanate ends produced in Production Example 5, were added 120 parts of polypropylene glycol monobutyl ether having an average repeat number of 19, 43.2 parts of Methyl Poly Glycol 130, and 0.07 parts of dibutyltin dilaurate, and the temperature was held at 80° C. until absorption of NCO disappeared in an IR spectrum. After cooling to 60° C., deionized water was added and thus an aqueous dispersion of a hydrophilicized carbodiimide compound (2) having a resin solid content of 25% was obtained. The resulting hydrophilicized carbodiimide compound was a compound represented by the above formula (III).

In the resulting hydrophilicized carbodiimide compound, the ratio of (i) a structure resulting from elimination of a hydroxyl group from polyethylene glycol monoalkyl ether and (ii) a structure resulting from elimination of a hydroxyl group from polypropylene glycol monoalkyl ether was (i):(ii)=1.0:1.0.

Production Example 7 reparation of Hydrophilicized Carbodiimide Compound (3)

By reacting 393 parts of 4,4-dicyclohexylmethane diisocyanate with 8 parts of 3-methyl-1-phenyl-2-phospholene- 1-oxide at 180° C. for 16 hours, obtained was a carbodiimide compound with a structure represented by the following formula, the carbodiimide compound having four carbodiimide groups in one molecule and having isocyanate groups at both ends. Here, 130 parts of polyethylene glycol monomethyl ether having an oxyethyltne group repeat number of 9 and 0.2 parts of dibutyltin dilaurate were added, followed by heating at 90° C. for 2 hours, and thus a carbodiimide compound with a structure represented by the following formula, the carbodiimide compound having an isocyanate group and a hydrophilic group at its ends was obtained. In addition, 300 parts of GP-3000 (trihydric polyol having a structure in which 17 mol, in average, of propylene oxide was added to respective three hydroxyl groups of glycerol, produced by Sanyo Chemical Industries, Ltd.) was added and was reacted at 90° C. for 6 hours. After confirming disappearance of a peak of NCO by IR measurement, the reaction was finished and thus a hydrophilicized carbodiimide compound (3) was obtained. Deionized water was added thereto and thus an aqueous dispersion of the hydrophilicized carbodiimide compound (3) having a resin solid content of 30% by mass was obtained. The resulting hydrophilicized carbodiimide compound was a compound represented by the above formula (II).

Production Example 8

Production of Coloring Pigment Paste

After preliminarily mixing 9.2 parts of a commercially available dispersing agent "Disperbyk 190" (produced by PYK-Chemie), 17.8 parts of ion-exchanged water, and 73.0 parts of rutile type titanium dioxide, a bead medium was added to the mixture in a paint conditioner, and mixed and dispersed at room temperature until the particle size reached 5 μm or less, and then the bead medium was removed by filtration and thus a coloring pigment paste was obtained.

Production Example 9

Production of Emulsion Resin

To reaction vessel containing 194.1 parts of ion-exchanged water were added 0.2 parts of ADEKA REASOAP NE-20 (α-[1-[(allyloxy)methyl]-2-(nonylphenoxy)ethyl]-ω-hydroxyoxyethylene, produced by ADEKA Corporation, aqueous solution having a solid content of 80% by weight) and 0.2 parts of Aqualon HS-10 (polyoxyethylene alkylpropenylphenyl ether sulfate, produced by DKS Co. Ltd.), the mixture was then heated to 80° C. with mixing and stirring under a nitrogen flow. Subsequently, a monomer mixture composed of 18.5 parts of methyl acrylate, 31.7 parts of ethyl acrylate, 5.8 parts of 2-hydroxyethyl acrylate, 10.0 parts of styrene, 4.0 parts of acrylamide, 0.3 parts of ADEKA REASOAP NE-20, 0.2 parts of Aqualon HS-10, and 70 parts of ion-exchanged water as an α,β-ethylenically unsaturated monomer mixture for the first step, and an initiator solution composed of 0.2 parts of ammonium persulfate and 7 parts of ion-exchanged water were dropped in parallel into the reaction vessel over 2 hours. After the completion of the dropping, aging was carried out at the same temperature for 1 hour.

Further, a monomer mixture composed of 24.5 parts of ethyl acrylate, 2.5 of 2-hydroxyethyl acrylate, 3.1 parts of methacrylic acid, 0.3 parts Aqualon HS-10, and 30 parts of ion-exchanged water as an α,β-ethylenically unsaturated monomer mixture for the second step, and an initiator solution composed of 0.1 parts of ammonium persulfate and 3 parts of ion-exchanged water were dropped in parallel into the reaction vessel at 80° C. over 0.5 hours. After the completion of the dropping, aging was carried out at the same temperature for 2 hours.

Subsequently, the mixture was cooled to 40° C. and was filtered with a 400 mesh filter. Further, a 10% by weight aqueous dimethylaminoethanol solution was added and the pH was adjusted to 7, and thus an emulsion resin having an average particle diameter of 110 nm, a solid content of 24% by weight, a solid content acid value of 20, and a hydroxyl value of 40 was obtained. The glass transition point was calculated to be 0° C. on the basis of the whole monomer composition.

Example 1

Preparation of Intermediate Coating Composition

A vessel equipped with a stirrer was charged with 119.67 parts (resin solid content: 30%) of the hydroxyl group-containing acrylic resin emulsion prepared in Production Example 1, then, 25.78 parts (resin solid content: 45%) of the hydroxy group-containing polyester resin prepared in Production Example 2, 24.19 parts of WM44-L70G (produced by Asahi Kasei Chemicals Corporation, solid concentration: 70.7%) as a water-dispersible blocked polyisocyanate, 13.5 parts (resin solid content: 40%) of the hydrophilicized carbodiimide compound prepared in Production Example 5, 100 parts (resin solid content: 30%) of an aqueous polyurethane resin, 122.11 parts of the pigment-dispersed paste portion prepared in Production Example 8, 68 parts of ion-exchanged water were added and stirred. Next, pH was adjusted to 8.0 in adding 0.01 parts of dimethylethanolamine (produced by KISHIDA CHEMICAL Co., Ltd.), and then, 1.0 part of ADEKA NOL UH-814N (urethane association type thickening agent, effective component: 30%, produced by ADEKA Corporation, trade name) was mixed and stirred, and thus an aqueous intermediate coating composition was obtained.

Preparation of Aqueous Base Coating Composition

In a vessel equipped with a stirrer, 100 parts (resin solid content: 25%) of the hydroxyl group-containing acrylic resin emulsion obtained in Production Example 1 and 125 parts (resin solid content: 24%) of the acrylate emulsion resin obtained in Production Example 9 were stirred and mixed, and then 21.2 parts of WM44-L70G (produced by Asahi Kasei Chemicals Corporation, solid concentration: 70.7%) as a water-dispersible blocked polyisocyanate, 12.5 parts (resin solid content: 40%) of the hydrophilicized carbodiimide compound prepared in Production Example 5, 66.7 parts (resin solid content: 30%) of an aqueous polyurethane resin, 21 parts (solid content: 65%, PWC 12%) of Alpaste MH8801 (produced by Asahi Kasei Corporation) as a luster pigment, 5 parts of an acrylic resin containing a phosphate group, and 0.3 parts of lauryl acid phosphate were added. Further, 30 parts of 2-ethylhexanol, 3.3 parts of ADEKA NOL UH-814N (thickening agent produced by ADEKA Corporation, solid content: 30%), 0.01 parts of dimethylethanolamine (produced by KISHIDA CHEMICAL Co., Ltd.), and 150 parts of ion-exchanged water were dispersed uniformly, and thus an aqueous base coating composition was obtained.

Formation of Multilayer Coating Film

Powernics 150 (trade name, cationic electrodeposition coating composition produced by Nippon Paint Automotive Coatings Co., Ltd.) was electrodeposition coated on a dull steel sheet treated with zinc phosphate such that the thickness of the dry coating film was 20 μm, followed by heat-curing at 160° C. for 30 minutes and subsequent cooling, and thus a steel substrate was prepared.

The aqueous intermediate coating composition was applied to the resulting substrate by using a rotary atomization type electrostatic applicator such that the thickness of the dry coating film was 25 μm, and then the aqueous base coating composition was applied by using a rotary atomization type electrostatic applicator such that the thickness of the dry coating film was 15 μm, followed by preheating at 80° C. for 3 minutes. The aqueous base coating composition was applied after an interval of 6 minutes from the application of the aqueous intermediate coating composition. In addition, Polyure Excel O-1200 (trade name, produced by Nippon Paint Automotive Coatings Co., Ltd., polyisocyanate compound-containing two-components acrylic urethane-based organic solvent type clear coating composition) was applied to the coated plate by using a rotary atomization type electrostatic applicator such that the thickness of the dry coating film was 35 μm, and then was heated and cured at 80° C. for 20 minutes, and thus a specimen on which a multilayer coating film had been formed was obtained.

Examples 2 to 17

Intermediate coating compositions and aqueous base coating compositions were prepared in the same manner as in Example 1 except that the components and their blending amounts were changed as shown in the following table in the preparation of the intermediate coating compositions and the aqueous base coating compositions. Using the coating compositions obtained, a multilayer coating film was formed in the same manner as in Example 1. The blending amounts shown in the following table are the resin solid content amount.

Example 18

Using the intermediate coating composition and the aqueous base coating composition prepared in Example 1, a multilayer coating film was formed in the following procedure.

WB-3110CB (trade name, produced by Nippon Paint Automotive Coatings Co., Ltd., non-chlorinated polyolefin-containing electroconductive coating composition) as an aqueous primer for adhesion was applied to a resin member (polypropylene) by using a rotary atomization type electrostatic applicator such that the thickness of the dry coating film was 15 μm, and subsequently, the aqueous intermediate coating composition was applied by using a rotary atomization type electrostatic applicator such that the thickness of the dry coating film was 25 μm, and then the aqueous base coating composition was applied by using a rotary atomization type electrostatic applicator such that the thickness of the dry coating film was 15 μm, followed by preheating at 80° C. for 3 minutes. In the above steps, the aqueous base coating composition was applied after an interval of 6 minutes from the application of the aqueous intermediate coating composition.

Next, Polyure Excel O-1200 (trade name, produced by Nippon Paint Automotive Coatings Co., Ltd., polyisocyanate compound-containing two-components acrylic urethane-based organic solvent type clear coating composition was applied to the coated plate by using a rotary atomization type electrostatic applicator such that the thickness of the dry coating film was 35 μm, and then was heated and cured at 80° C. for 20 minutes, and thus a specimen on which a multilayer coating film had been formed was obtained.

Comparative Examples 1 to 7

Intermediate coating compositions and aqueous base coating compositions were prepared in the same manner as in Example 1 except that the components and their blending amounts were changed as shown in the following table in the preparation of the intermediate coating compositions and the aqueous based coating compositions. Using the coating compositions obtained, a multilayer coating film was formed in the same manner as in Example 1.

For the multilayer coating films obtained in the examples and the comparative examples described above as well as the raw materials used in the preparation of the intermediate coating compositions and the aqueous base coating compositions, evaluation tests were carried out as described below. The results of the evaluation are shown in the following tables.

Measurement of Elongation at Break of Aqueous Polyurethane Resin (D)

Ninety-five parts (resin solid content amount) of the aqueous polyurethane resin (D) and 5 part by mass (resin solid content amount) of the hydrophilicized carbodiimide compound (C) described in Production Example 5 were mixed such that the resin solid contents thereof was 100 parts by mass in total. In a clean environment where dusts or the like do not adhere, the mixed liquid prepared was applied onto a flat polypropylene plate uniformly with a doctor blade such that the thickness of the dry coating film was 20 μm. After leaving at rest at 20° C. for 10 minutes, the resulting plate was preheated at 80° C. for 3 minutes, thereby volatilizing water, and then was baked at 120° C. for 30 minutes, and thus a cured film was prepared. The cured film obtained was subjected to a tensile performance test at a testing temperature of −20° C. in accordance with JIS K7127 and an elongation ratio at the time of breaking (elongation at break) was measured. Measurement was performed 20 times and the average of 18 measurements except the maximum and the minimum values was taken as the elongation at break of the sample.

Evaluation of Chipping Resistance

The test plates each with a multilayer coating film obtained in the examples and the comparative examples were subjected to a stepping stone test under the conditions shown below using a Gravelometer KSS-1 (produced by Suga Test Instruments Co., Ltd.).

<Test Conditions>

Stone size: 6 to 8 mm

Amount of stone: 0.7 to 0.8 g/piece

Distance: 35 cm

Shot pressure: 0.6 kg/cm$^2$

Shot angle: 45°

Test temperature: −20° C.

The test plates after the stepping stone test were evaluated visually according to the following criteria. Under the following criteria, when the score is 4 or more, the test plate can be used practically and is judged to be acceptable.

5: Almost no exfoliation is observed.
4: The exfoliated area is small, and almost no exfoliation is observed at the interface between the electrodeposition coating film and the intermediate coating film.
3: The exfoliated area is slightly large and exfoliation is observed at the interface between the electrodeposition coating film and the intermediate coating film.
2: The exfoliated area is large and exfoliation is observed at the interface between the electrodeposition coating film and the intermediate coating film.
1: The exfoliated area is large and the electrodeposition coating film is broken.

Evaluation of Water-Resistant Adhesion

The test plates each with a multilayer coating film were immersed in warm water at 40° C. for 240 hours and removed therefrom, and were then dried at 20° C. for 24 hours. Lattice-like cuts were made in the multilayer coating film on each of the test plates with a knife to reach the base material, so that 100 crosscuts having a size of 2 mm×2 mm were made. Subsequently, an Adhesive Cellophane Tape (trademark) was affixed to each of the test plates, the tape was abruptly peeled off at 20° C., and the number of remaining crosscut coating films was counted.

The relative merits of the coating film can be judged from the number of peeled crosscut sections. Even if only one crosscut section peeled, the sample is judged to be difficult to be used practically.

Evaluation of Water-Resistant Shrinkage

The test plates each with a multilayer coating film were immersed in warm water at 40° C. for 240 hours and removed therefrom, and were then dried at 20° C. for 24 hours. Then, each of the test plates was examined visually, and change in its appearance before and after the test was observed. Under the following criteria, test plates with rating ◯ or ◯△ can be judged to be practically usable.
◯: Almost no difference is observed in gloss and smoothness.
◯△: Slight change is observed in gloss and smoothness.
△: Change is observed in gloss and smoothness.
△x: Change is observed in both gloss and smoothness, and especially, change in gloss is remarkable.
x: Remarkable difference is observed in both gloss and smoothness.

Evaluation of Moisture-Resistant Adhesion

The test plates each with a multilayer coating film were exposed to an atmosphere having humidity of 99% or more at 40° C. and 50° C. for 240 hours. After the completion of the exposure and subsequent drying at 20° C. for 24 hours, lattice-like cuts were made in the multilayer coating film on each of the test plates with a knife to reach the base material, so that 100 crosscuts having a size of 2 mm×2 mm were made. Subsequently, an Adhesive Cellophane Tape (trademark) was affixed to each of the test plates, the tape was abruptly peeled off at 20° C., and the number of remaining crosscut coating films was counted.

The relative merits of the coating film can be judged from the number of peeled crosscut sections. Even if only one crosscut section peeled, the sample is judged to be difficult to be used practically.

Stability Evaluation of Intermediate Coating Composition and Aqueous Base Coating Composition A coating composition was prepared and left at rest at 40° C. for 3 days. Then, when a sample in which non-flowable masses were formed in the coating material liquid or the coating material liquid lost its flowability as a whole, it was judged to be unacceptable (x), and otherwise it was judged to be acceptable (o).

TABLE 1

| | | | Example 1 | Example 2 | Example 3 | Example 4 | Example 5 | Example 6 | Example 7 | Example 8 |
|---|---|---|---|---|---|---|---|---|---|---|
| Primer | | | — | — | — | — | — | — | — | — |
| Intermediate coating composition | (B) Water-dispersible blocked polyisocyanate | Blending amount | 17.1 | 17.1 | 17.1 | 20.1 | 14.5 | 17.1 | 17.1 | 17.1 |
| | (C) Hydrophilicized carbodiimide compound | Type | Production Example 5 | Production Example 5 | Production Example 5 | Production Example 5 | Production Example 5 | Production Example 5 | Production Example 5 | Production Example 5 |
| | | Blending amount | 5.4 | 5.4 | 5.4 | 2.4 | 8 | 5.4 | 5.4 | 5.4 |
| | (A) Acrylic resin having hydroxyl group and carboxyl group | Type | Production Example 1 | Production Example 1 | Production Example 1 | Production Example 1 | Production Example 1 | Production Example 1 | Production Example 1 | Production Example 1 |
| | | Blending amount | 35.9 | 25.9 | 35.9 | 35.9 | 35.9 | 35.9 | 35.9 | 40.9 |
| | (A) Polyester resin having hydroxyl group and carboxyl group | Blending amount | 11.6 | 11.6 | 11.6 | 11.6 | 11.6 | 11.6 | 11.6 | 11.6 |
| | (D) Aqueous polyurethane resin | Type | D | D | D | D | D | D | D | D |
| | | Blending amount | 30 | 40 | 30 | 30 | 30 | 30 | 30 | 25 |
| | | Tg | −60 | −60 | −60 | −60 | −60 | −60 | −60 | −60 |
| | | Elongation at break | 610 | 610 | 610 | 610 | 610 | 610 | 610 | 610 |
| | Total of blending amounts of resins | | 100.0 | 100.0 | 100.0 | 100.0 | 100.0 | 100.0 | 100.0 | 100.0 |
| | Stability (40° C., 3 days) | | ○ | ○ | ○ | ○ | ○ | ○ | ○ | ○ |
| Aqueous base coating composition | (B) Water-dispersible blocked polyisocyanate | Blending amount | 15 | 15 | 15 | 15 | 15 | 18 | 12 | 18 |
| | (C) Hydrophilicized carbodiimide compound | Type | Production Example 5 | Production Example 5 | Production Example 5 | Production Example 5 | Production Example 5 | Production Example 5 | Production Example 5 | Production Example 5 |
| | | Blending amount | 5 | 5 | 5 | 5 | 5 | 2 | 8 | 2 |

TABLE 1-continued

|  |  |  | | | | | | | | |
|---|---|---|---|---|---|---|---|---|---|---|
|  | (A) Acrylic resin having hydroxyl group and carboxyl group | Type | Production Example 1 | Production Example 1 | Production Example 1 | Production Example 1 | Production Example 1 | Production Example 1 | Production Example 1 | Production Example 1 |
|  |  | Blending amount | 30 | 30 | 35 | 30 | 30 | 30 | 30 | 30 |
|  | Emulsion resin of Production Example 9 | Blending amount | 30 | 30 | 30 | 30 | 30 | 30 | 30 | 30 |
|  | (D) Aqueous polyurethene resin | Type | D | D | D | D | D | D | D | D |
|  |  | Blending amount | 20 | 20 | 15 | 20 | 20 | 20 | 20 | 20 |
|  |  | Tg | −60 | −60 | −60 | −60 | −60 | −60 | −60 | −60 |
|  |  | Elongation at break | 610 | 610 | 610 | 610 | 610 | 610 | 610 | 610 |
|  | Total of blending amounts of resins |  | 100 | 100 | 100 | 100 | 100 | 100 | 100 | 100 |
|  | Stability (40° C., 3 days) |  | ○ | ○ | ○ | ○ | ○ | ○ | ○ | ○ |
| Clear coating composition (Polyure Excel O-1200) |  |  | ← | ← | ← | ← | ← | ← | ← | ← |
| Performance of baking at 80° C. for 20 minutes | Water-resistant adhesion (Number of 100-crosscuts peeled sections) |  | 0 | 0 | 0 | 0 | 0 | 0 | 0 | 0 |
|  | Water-resistant shrinkage |  | ○ | ○ | ○ | ○ | ○Δ | ○ | ○Δ | ○ |
|  | Moisture-resistant adhesion (Number of 100-crosscuts peeled sections) |  | 0 | 0 | 0 | 0 | 0 | 0 | 0 | 0 |
|  | Chipping resistance (5: good; 4 or more: Acceptable) |  | 5 | 5 | 5 | 5 | 5 | 5 | 5 | 4 |

|  |  |  | Example 9 | Example 10 | Example 11 | Example 12 | Example 13 | Example 14 |
|---|---|---|---|---|---|---|---|---|
| Primer |  |  | — | — | — | — | — | — |
| Intermediate coating composition | (B) Water-dispersible blocked polyisocyanate | Blending amount | 17.1 | 17.1 | 17.1 | 17.1 | 17.1 | 17.1 |
|  | (C) Hydrophilicized carbodiimide compound | Type | Production Example 5 | Production Example 6 | Production Example 7 | Production Example 5 | Production Example 5 | Production Example 5 |
|  |  | Blending amount | 5.4 | 5.4 | 5.4 | 5.4 | 5.0 | 5.4 |
|  | (A) Acrylic resin having hydroxyl group and carboxyl group | Type | Production Example 1 | Production Example 1 | Production Example 1 | Production Example 1 | Production Example 1 | Production Example 2 |
|  |  | Blending amount | 40.9 | 35.9 | 35.9 | 35.9 | 35.9 | 35.9 |
|  | (A) Polyester resin having hydroxyl group and carboxyl group | Blending amount | 11.6 | 11.6 | 11.6 | 11.6 | 11.6 | 11.6 |
|  | (D) Aqueous polyurethene resin | Type | D | D | D | D | D | D |
|  |  | Blending amount | 25 | 30 | 30 | 30 | 30 | 30 |
|  |  | Tg | −60 | −60 | −60 | −60 | −60 | −60 |
|  |  | Elongation at break | 610 | 610 | 610 | 610 | 610 | 610 |
|  | Total of blending amounts of resins |  | 100.0 | 100.0 | 100.0 | 100.0 | 100.0 | 100.0 |
|  | Stability (40° C., 3 days) |  | ○ | ○ | ○ | ○ | ○ | ○ |
| Aqueous base coating composition | (B) Water-dispersible blocked polyisocyanate | Blending amount | 18 | 18 | 18 | 18 | 18 | 18 |
|  | (C) Hydrophilicized carbodiimide compound | Type | Production Example 5 | Production Example 5 | Production Example 5 | Production Example 6 | Production Example 7 | Production Example 5 |
|  |  | Blending amount | 2 | 2 | 2 | 2 | 2 | 2 |
|  | (A) Acrylic resin having hydroxyl group and carboxyl group | Type | Production Example 1 | Production Example 1 | Production Example 1 | Production Example 1 | Production Example 1 | Production Example 1 |
|  |  | Blending amount | 35 | 30 | 30 | 30 | 30 | 30 |
|  | Emulsion resin of Production Example 9 | Blending amount | 30 | 30 | 30 | 30 | 30 | 30 |
|  | (D) Aqueous polyurethene resin | Type | D | D | D | D | D | D |
|  |  | Blending amount | 15 | 20 | 20 | 20 | 20 | 20 |
|  |  | Tg | −60 | −60 | −60 | −60 | −60 | −60 |
|  |  | Elongation at break | 610 | 610 | 610 | 610 | 610 | 610 |
|  | Total of blending amounts of resins |  | 100 | 100 | 100 | 100 | 100 | 100 |
|  | Stability (40° C., 3 days) |  | ○ | ○ | ○ | ○ | ○ | ○ |
| Clear coating composition (Polyure Excel O-1200) |  |  | ← | ← | ← | ← | ← | ← |
| Performance of baking at 80° C. for 20 minutes | Water-resistant adhesion (Number of 100-crosscuts peeled sections) |  | 0 | 0 | 0 | 0 | 0 | 0 |
|  | Water-resistant shrinkage |  | ○ | ○ | ○ | ○ | ○ | ○ |
|  | Moisture-resistant adhesion (Number of 100-crosscuts peeled sections) |  | 0 | 0 | 0 | 0 | 0 | 0 |

TABLE 1-continued

|  |  |  | Chipping resistance (5: good; 4 or more: Acceptable) | 4 | 5 | 5 | 5 | 5 | 5 |
|---|---|---|---|---|---|---|---|---|---|

|  |  |  |  | Example 15 | Example 16 | Example 17 | Example 18 |
|---|---|---|---|---|---|---|---|
|  | Primer |  |  | — | — | — | Aqueous primer |
|  | Intermediate coating composition | (B) Water-dispersible blocked polyisocyanate | Blending amount | 17.1 | 17.1 | 17.1 | 17.2 |
|  |  | (C) Hydrophilicized carbodiimide compound | Type | Production Example 5 | Production Example 5 | Production Example 5 | Production Example 5 |
|  |  |  | Blending amount | 5.4 | 5.4 | 5.4 | 5.4 |
|  |  | (A) Acrylic resin having hydroxyl group and carboxyl group | Type | Production Example 3 | Production Example 1 | Production Example 1 | Production Example 1 |
|  |  |  | Blending amount | 35.9 | 35.9 | 35.9 | 35.9 |
|  |  | (A) Polyester resin having hydroxyl group and carboxyl group | Blending amount | 11.6 | 11.6 | 11.6 | 11.6 |
|  |  | (D) Aqueous polyurethene resin | Type | D | D | D | D |
|  |  |  | Blending amount | 30 | 30 | 30 | 30 |
|  |  |  | Tg | −60 | −60 | −60 | −60 |
|  |  |  | Elongation at break | 610 | 610 | 610 | 610 |
|  |  | Total of blending amounts of resins |  | 100.0 | 100.0 | 100.0 | 100.0 |
|  |  | Stability (40° C., 3 days) |  | ○ | ○ | ○ | ○ |
|  | Aqueous base coating composition | (B) Water-dispersible blocked polyisocyanate | Blending amount | 18 | 18 | 18 | 15 |
|  |  | (C) Hydrophilicized carbodiimide compound | Type | Production Example 5 | Production Example 5 | Production Example 5 | Production Example 5 |
|  |  |  | Blending amount | 2 | 2 | 2 | 5 |
|  |  | (A) Acrylic resin having hydroxyl group and carboxyl group | Type | Production Example 1 | Production Example 2 | Production Example 3 | Production Example 1 |
|  |  |  | Blending amount | 30 | 30 | 30 | 30 |
|  |  | Emulsion resin of Production Example 9 | Blending amount | 30 | 30 | 30 | 30 |
|  |  | (D) Aqueous polyurethene resin | Type | D | D | D | D |
|  |  |  | Blending amount | 20 | 20 | 20 | 20 |
|  |  |  | Tg | −60 | −60 | −60 | −60 |
|  |  |  | Elongation at break | 610 | 610 | 610 | 610 |
|  |  | Total of blending amounts of resins |  | 100 | 100 | 100 | 100 |
|  |  | Stability (40° C., 3 days) |  | ○ | ○ | ○ | ○ |
|  | Clear coating composition (Polyure Excel O-1200) |  |  | ← | ← | ← | ← |
|  | Performance of baking at 80° C. for 20 minutes | Water-resistant adhesion (Number of 100-crosscuts peeled sections) |  | 0 | 0 | 0 | 0 |
|  |  | Water-resistant shrinkage |  | ○ | ○ | ○ | ○ |
|  |  | Moisture-resistant adhesion (Number of 100-crosscuts peeled sections) |  | 0 | 0 | 0 | 0 |
|  |  | Chipping resistance (5: good; 4 or more: Acceptable) |  | 5 | 5 | 5 | 5 |

TABLE 2

|  |  |  | Comparative Example 1 | Comparative example 2 | Comparative Example 3 | Comparative example 4 |
|---|---|---|---|---|---|---|
| Intermediate coating composition | (B) Water-dispersible blocked polyisocyanate | Blending amount | 22.5 | 17.1 | 17.1 | 17.1 |
|  | (C) Hydrophilicized carbodiimide compound | Type | Production Example 5 | Production Example 5 | Production Example 5 | Production Example 5 |
|  |  | Blending amount | 0 | 5.4 | 5.4 | 5.4 |
|  | (A) Acrylic resin having hydroxyl group and carboxyl group | Type | Production Example 1 | Production Example 1 | Production Example 1 | Production Example 1 |
|  |  | Blending amount | 35.9 | 35.9 | 35.9 | 35.9 |

TABLE 2-continued

| | | | | | | |
|---|---|---|---|---|---|---|
| | (A) Polyester resin having hydroxyl group and carboxyl group | Blending amount | 11.6 | 11.6 | 11.6 | 11.6 |
| | (D) Aqueous polyurethene resin | Type | D | A | B | C |
| | | Blending amount | 30 | 30 | 30 | 30 |
| | | Tg | −60 | −10 | −18 | −60 |
| | | Elongation at break | 610 | 12 | 130 | 312 |
| | Total of blending amounts of resins | | 100.0 | 100.0 | 100.0 | 100.0 |
| | Stability (40° C., 3 days) | | ○ | ○ | ○ | ○ |
| Aqueous base coating composition | (B) Water-dispersible blocked polyisocyanate | Blending amount | 20 | 20 | 20 | 20 |
| | (C) Hydrophilicized carbodiimide compound | Type | Production Example 5 | Production Example 5 | Production Example 5 | Production Example 5 |
| | | Blending amount | 0 | 0 | 0 | 0 |
| | (A) Acrylic resin having hydroxyl group and carboxyl group | Type | Production Example 1 | Production Example 1 | Production Example 1 | Production Example 1 |
| | | Blending amount | 30 | 30 | 30 | 30 |
| | Emulsion resin of Production Example 9 | Blending amount | 30 | 30 | 30 | 30 |
| | (D) Aqueous polyurethene resin | Type | D | D | D | D |
| | | Blending amount | 20 | 20 | 20 | 20 |
| | | Tg | −60 | −60 | −60 | −60 |
| | | Elongation at break | 610 | 610 | 610 | 610 |
| | Total of blending amounts of resins | | 100 | 100 | 100 | 100 |
| | Stability (40° C., 3 days) | | ○ | ○ | ○ | ○ |
| Clear coating composition (Polyure Excel O-1200) | | | ← | ← | ← | ← |
| Performance of baking at 80° C. for 20 minutes | Water-resistance adhesion (Number of 100-crossscuts peeled sections) | | 50 | 10 | 5 | 0 |
| | Water-resistance shrinkage | | x | Δx | Δx | Δ |
| | Moisture-resistant adhesion (Number of 100-crosscuts peeled sections) | | 70 | 20 | 10 | 0 |
| | Chipping resistance (5: Good; 4 or more: Acceptable) | | 5 | 1 | 2 | 2 |

| | | | Comparative Example 5 | Comparative Example 6 | Comparative example 7 |
|---|---|---|---|---|---|
| Intermediate coating composition | (B) Water-dispersible blocked polyisocyanate | Blending amount | 22.5 | 22.5 | 22.5 |
| | (C) Hydrophilicized carbodiimide compound | Type | Production Example 5 | Production Example 5 | Production Example 5 |
| | | Blending amount | 0 | 0 | 0 |
| | (A) Acrylic resin having hydroxyl group and carboxyl group | Type | Production Example 1 | Production Example 1 | Production Example 1 |
| | | Blending amount | 35.9 | 35.9 | 35.9 |
| | (A) Polyester resin having hydroxyl group and carboxyl group | Blending amount | 11.6 | 11.6 | 11.6 |
| | (D) Aqueous polyurethene resin | Type | D | D | D |
| | | Blending amount | 30 | 30 | 30 |
| | | Tg | −60 | −60 | −60 |
| | | Elongation at break | 610 | 610 | 610 |
| | Total of blending amounts of resins | | 100.0 | 100.0 | 100.0 |
| | Stability (40° C., 3 days) | | ○ | ○ | ○ |
| Aqueous base coating composition | (B) Water-dispersible blocked polyisocyanate | Blending amount | 15 | 15 | 15 |
| | (C) Hydrophilicized carbodiimide compound | Type | Production Example 5 | Production Example 5 | Production Example 5 |
| | | Blending amount | 5 | 5 | 5 |
| | (A) Acrylic resin having hydroxyl group and carboxyl group | Type | Production Example 1 | Production Example 1 | Production Example 1 |
| | | Blending amount | 30 | 30 | 30 |
| | Emulsion resin of Production Example 9 | Blending amount | 30 | 30 | 30 |
| | (D) Aqueous polyurethene resin | Type | A | B | C |
| | | Blending amount | 20 | 20 | 20 |

TABLE 2-continued

| | | | | |
|---|---|---|---|---|
| | Tg | −10 | −18 | −60 |
| | Elongation at break | 12 | 130 | 312 |
| | Total of blending amounts of resins | 100 | 100 | 100 |
| | Stability (40° C., 3 days) | ○ | ○ | ○ |
| Clear coating composition (Polyure Excel O-1200) | | ← | ← | ← |
| Performance of baking at 80° C. for 20 minutes | Water-resistance adhesion (Number of 100-crossscuts peeled sections) | 60 | 55 | 60 |
| | Water-resistance shrinkage | x | x | Δx |
| | Moisture-resistant adhesion (Number of 100-crosscuts peeled sections) | 80 | 80 | 80 |
| | Chipping resistance (5: Good; 4 or more: Acceptable) | 2 | 3 | 3 |

The types of the aqueous polyurethane resins shown in the above tables are as follows.

A: N9603 (produced by Kusumoto Chemicals, Ltd.), solid concentration: 34%, Tg: −10° C., elongation at break: 12%

B: HUX-232 (produced by ADEKA Corporation), solid concentration: 30%, Tg: −18° C., elongation at break: 130%

C: N800 (produced by Sanyo Chemical Industries, Ltd.), solid concentration: 38%, Tg: −60° C., elongation at break: 312%

D: PERMARIN U150 (produced by Sanyo Chemical Industries, Ltd.), solid concentration: 30%, Tg: −60° C., elongation at break: 610%

The multilayer coating film formed using the aqueous coating compositions of the examples were confirmed to have excellent water resistance, moisture resistance, and chipping resistance even after the multilayer coating film were subjected to baking and curing at a low-temperature condition of 80° C.

On the other hand, the multilayer coating films formed using the aqueous coating compositions of the comparative examples were configured to be inferior in one or two or more of water resistance, moisture resistance, and chipping resistance.

INDUSTRIAL APPLICABILITY

The aqueous coating composition of the present invention is advantageous in that a curing reaction proceeds well even under heating conditions under low temperature conditions (e.g., heating conditions at 100° C. or less), so that a cured coating film having excellent coating film properties can be obtained. By use of the aqueous coating composition of the present invention, it is possible to obtain a coating film having excellent coating film properties (water resistance, chipping resistance, etc.) under milder heating conditions. By performing coating using the aqueous coating composition of the present invention, it is possible to reduce burden on the environment, such as energy saving and reduction in $CO_2$ emission.

The invention claimed is:

1. An aqueous coating composition comprising:
an aqueous resin having a hydroxyl group and a carboxyl group (A),
a water-dispersible blocked polyisocyanate compound (B),
a hydrophilicized carbodiimide compound (C), and
an aqueous polyurethane resin (D),
wherein
the aqueous resin having a hydroxyl group and a carboxyl group (A) has a hydroxyl value of 80 to 200 mgKOH/g and an acid value of 10 to 40 mgKOH/g in terms of resin solid content,
the hydrophilicized carbodiimide compound (C) is a compound represented by formula (I), (II), or (III) below,
the aqueous polyurethane resin (D) has a glass transition point (Tg) of −50° C. or less, and
a cured film of the aqueous polyurethane resin (D) has an elongation at break of 400% or more at −20° C.,

[Chemical Formula 1]

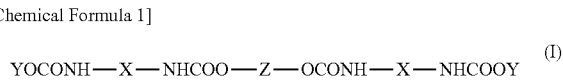

wherein X is a bifunctional organic group having at least one carbodiimide group, Y is each same or different structure resulting from elimination of a hydroxyl group from a polyalkylene glycol monoalkyl ether, and Z is a structure resulting from elimination of a hydroxyl group from a bifunctional polyol having a number-average molecular weight of 200 to 5,000,

[Chemical Formula 2]

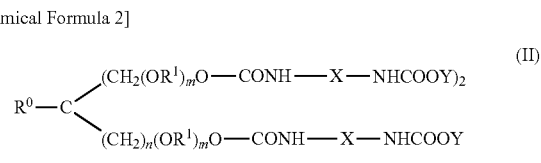

wherein each X is a bifunctional organic group having at least one carbodiimide group, Y is each same or different structure resulting from elimination of a hydroxyl group from a polyalkylene glycol monoalkyl ether, $R^0$ is hydrogen, a methyl group or an ethyl group, each $R^1$ is an alkylene group having 4 or less carbon atoms, n is 0 or 1, and each m is a number from 0 to 60,

[Chemical Formula 3]

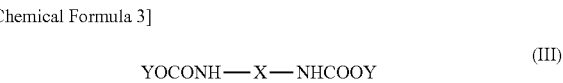

wherein X is a bifunctional organic group having at least one carbodiimide group, and Y is each same or different structure resulting from elimination of a hydroxyl group from a polyalkylene glycol monoalkyl ether.

2. The aqueous coating composition according to claim 1, wherein a content of the hydrophilicized carbodiimide compound (C) is 1 to 8% by mass in terms of a resin solid content of the aqueous coating composition.

3. The aqueous coating composition according to claim 1, wherein the aqueous resin (A) comprises an acrylic emulsion having a number-average molecular weight of 10,000 to 80,000.

4. The aqueous coating composition according to claim 1, wherein the hydrophilicized carbodiimide compound (C) represented by the formula (III) above is a compound below,

[Chemical Formula 4]

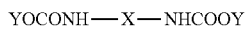

$$YOCONH-X-NHCOOY \quad (III)$$

wherein X is a bifunctional organic group having at least one carbodiimide group, and Y is each same or different structure selected from (i) and (ii) below:
(i) a structure resulting from elimination of a hydroxyl group from a polyethylene glycol monoalkyl ether in which an alkyl group having 1 to 3 carbon atoms is ether-linked to an end of a polyethylene oxide unit having a repeat number of 6 to 20,
(ii) a structure resulting from elimination of a hydroxyl group from a polypropylene glycol monoalkyl ether in which an alkyl group having 1 to 8 carbon atoms is ether-linked to an end of a polypropylene oxide unit having a repeat number of 4 to 60.

5. The aqueous coating composition according to claim 4, wherein in the hydrophilicized carbodiimide compound (C) represented by the formula (III) above,
one Y is the (i) and another Y is the (ii), and
a ratio of the structure (i) to the structure (ii) is within a range of (i):(ii)=1:0.7 to 1:8.

6. The aqueous coating composition according to claim 1, wherein a content of the aqueous polyurethane resin (D) is 15% by mass or more in terms of the resin solid content of the aqueous coating composition.

7. The aqueous coating composition according to claim 1, wherein a content of the aqueous polyurethane resin (D) is 30% by mass or more and 40% by mass or less in terms of the resin solid content of the aqueous coating composition.

8. The aqueous coating composition according to claim 1, wherein a content of the aqueous polyurethane resin (D) is 15% by mass or more and less than 30% by mass in terms of the resin solid content of the aqueous coating composition.

9. The aqueous coating composition according to claim 1, wherein
a content of the water-dispersible blocked polyisocyanate compound (B) is 10 to 25% by mass in terms of the resin solid content of the aqueous coating composition, and
a content of the hydrophilicized carbodiimide compound (C) is 1.5 to 7% by mass in terms of the resin solid content of the aqueous coating composition.

10. The aqueous coating composition according to claim 1, wherein a mass ratio of the content of the water-dispersible blocked polyisocyanate compound (B) to the content of the hydrophilicized carbodiimide compound (C) in terms of the resin solid content of the aqueous coating composition is (B):(C)=25:1 to 1.25:1.

11. A method for forming a coating film in use of an aqueous coating composition, wherein the method comprises:
a coating step of applying the aqueous coating composition according to claim 1 to an object to be coated to form a coating film, and
a curing step of curing the resulting coating film at 70 to 100° C.

12. The method for forming a coating film according to claim 11, wherein
the coating step comprises:
a first coating step of applying the aqueous coating composition, wherein a content of the aqueous polyurethane resin (D) is 30% by mass or more and 40% by mass or less in terms of the resin solid content of the aqueous coating composition, onto an object to be coated to form a first coating film, and
a second application step of applying the aqueous coating composition, wherein a content of the aqueous polyurethane resin (D) is 15% by mass or more and less than 30% by mass in terms of the resin solid content of the aqueous coating composition, onto the first coating film to form a second coating film.

13. The method for forming a coating film according to claim 11, wherein the object to be coated includes a steel plate part and a resin part.

* * * * *